(12) United States Patent
Ratcliffe

(10) Patent No.: US 7,197,194 B1
(45) Date of Patent: Mar. 27, 2007

(54) VIDEO HORIZONTAL AND VERTICAL VARIABLE SCALING FILTER

(75) Inventor: Martin J. Ratcliffe, Bracknell (GB)

(73) Assignee: LSI Logic Corporation, Milpitas, CA (US)

( * ) Notice: Subject to any disclaimer, the term of this patent is extended or adjusted under 35 U.S.C. 154(b) by 918 days.

(21) Appl. No.: 09/855,011

(22) Filed: May 14, 2001

(51) Int. Cl.
*G06K 9/32* (2006.01)

(52) U.S. Cl. .................. 382/298; 382/307; 326/46

(58) Field of Classification Search ................ 382/298, 382/299, 307, 300; 326/46
See application file for complete search history.

(56) References Cited

U.S. PATENT DOCUMENTS

| | | | |
|---|---|---|---|
| 4,376,290 A * | 3/1983 | Shirota | 386/2 |
| 5,089,893 A * | 2/1992 | Iwase | 348/581 |
| 5,363,119 A * | 11/1994 | Snyder et al. | 345/668 |
| 5,574,572 A * | 11/1996 | Malinowski et al. | 358/451 |
| 5,712,689 A * | 1/1998 | Yasuki et al. | 348/561 |
| 5,784,047 A * | 7/1998 | Cahill et al. | 345/660 |
| 5,982,459 A * | 11/1999 | Fandrianto et al. | 348/425.3 |
| 6,064,450 A * | 5/2000 | Canfield et al. | 375/240.29 |
| 6,078,616 A * | 6/2000 | Ozcelik et al. | 375/240.27 |
| 6,259,479 B1 * | 7/2001 | Gadre et al. | 348/441 |
| 6,356,315 B1 * | 3/2002 | Chen et al. | 348/581 |

OTHER PUBLICATIONS

Martin Ratcliffe, "Bandwidth Management", U.S. Appl. No. 09/838,784, filed Apr. 19, 2001.

* cited by examiner

*Primary Examiner*—Matthew C. Bella
*Assistant Examiner*—Dennis Rosario
(74) *Attorney, Agent, or Firm*—Christopher P. Maiorana PC

(57) ABSTRACT

An apparatus for variably scaling video picture signals comprising a first circuit and a second circuit. The first circuit may be configured to generate one or more data signals vertically scaled to a first value in response to (i) the video picture signals and (ii) one or more control signals. The second circuit may be configured to generate one or more output signals horizontally scaled to a second value in response to (i) the one or more data signals and (ii) the one or more control signals. The first value and the second value are independently selectable.

22 Claims, 14 Drawing Sheets

VIDEO HORIZONTAL AND VERTICAL VARIABLE SCALING FILTER

CROSS REFERENCE TO RELATED APPLICATIONS

The present application claims the benefit of U.S. Ser. No. 09/838,784, filed Apr. 19, 2001, which is hereby incorporated by reference in its entirety.

FIELD OF THE INVENTION

The present invention relates to a method and/or architecture for implementing decoder video plane variable scaling generally and, more particularly, to a video horizontal and vertical variable scaling filter that may be used in a single chip MPEG-2 decoder.

BACKGROUND OF THE INVENTION

A vertical filter is used in, for example, an MPEG-2 video decoder to scale the video picture and reduce height of the video picture. After each input video frame is written into a framestore memory the video frame is scaled to a smaller size using the vertical filter. The filter reads a number of input video display lines from a linestore. As each new output line is calculated, the filter needs some new input lines to be loaded into the linestore from the framestore memory. With the output picture at a quarter of the input size, the linestore loading requires four new input lines to be loaded from the framestore memory for each output line calculated.

Referring to FIG. 1, a block diagram of a circuit 10 illustrating a conventional MPEG-2 video display controller is shown. The circuit 10 includes a circuit 12 and a circuit 14. The circuit 12 is a post-processing display filter circuit. The circuit 14 is a filter controller circuit.

The circuit 12 includes a luma line buffer 20 that receives a 64-bit wide video data signal at an input and is serially connected to a 4-tap luma vertical filter 22. The luma vertical filter 22 receives an address signal that is presented by the filter controller 14. The luma vertical filter 22 is connected in series with a decimation filter 23. The circuit 12 also includes a chroma line buffer 26 that receives the 64-bit wide video data signal at an input and is serially connected to a 2-tap chroma vertical filter 28. The chroma vertical filter 28 receives an address signal that is presented by the filter controller 14. The chroma vertical filter 28 is connected in series with a decimation filter 29. The luma vertical filter 22 and the chroma vertical filter 28 present vertically scaled video display pixels (pels) to the 2:1 horizontal decimation filters 23 and 29. The horizontal decimation filters 23 and 29 present scaled pels to the luma buffer 24 and chroma buffer 30. The vertical filters 22 and 28 include finite impulse response (FIR) filters and multiply-accumulate cells (described below in connection with FIGS. 2 and 3, respectively). The horizontal filter 32 includes a horizontal interpolating filter and a phase accumulator (described below in connection with FIGS. 4 and 5, respectively).

The filter controller 14 receives video display control signals generated by an SDRAM controller and a host interface. The filter controller 14 includes an address generator 40 and display register 42. The circuit 10 can interpolate and reposition luma and chroma pels to improve picture quality. The circuit 10 can also perform vertical letterbox filtering in fixed 75% and 50% values. For horizontal filtering the display controller 10 includes two separate filters. These filters are the simple 2:1 decimation filters 23 and 29 using bilinear averaging and an 8-tap polyphase interpolation filter 32.

Referring to FIG. 2, a block diagram of a circuit 50 illustrating an exemplary 4-tap FIR filter is shown. The 4-tap FIR filter 50 is used for the luma vertical filter 22.

Referring to FIG. 3, a block diagram of a circuit 60 illustrating a multiply-accumulate cell and luma linestore circuit of the vertical filter 22 is shown. The filter area of the circuit 10 is reduced by implementing a single multiply-accumulate cell for each of the 4 lines to be filtered. The input line to the multiply-accumulate cell 60 is multiplexed to the multiplier. The multiplier accumulates each successive output with the result from the previous line. A 4-tap filter is implemented after 4 clock cycles.

The line buffer memory is 64 bits wide. The circuit 10 is improved by filtering the whole word at once (i.e., filtering 8 pels with the 8 multiply-accumulate cells 60). Filtering the whole word is implemented by writing words into the memory in an interleaved order and reading out each successive word containing 8 pels from the next required line. Circuitry similar to the circuit 60 is implemented for the chroma 2-tap FIR filter 28. In the chroma filter 28, the linestore is 192×64 bits and interleaves 2 lines for the filter taps.

The loading of the vertical filter linestores is controlled by separate state-machines for luma filter 22 and chroma filter 28. The state-machines directly control the decimation from 4 lines to 3 lines for 75% scaling or from 2 lines to 1 line for 50% scaling. The 2:1 horizontal decimation filters 23 and 29 are bilinear averaging filters. The horizontal filters average adjacent pels from the vertical filter circuits 22 and 28 (i.e., 8 pels input) to provide an output of 4 pels.

Referring to FIG. 4, a block diagram of a circuit 70 illustrating a horizontal interpolating filter section of the horizontal filter 32 is shown. The circuit 70 receives the pels presented by the luma buffer 24 and the chroma buffer 30. The interpolating filter circuit 70 is an 8-tap 8 phase polyphase FIR filter. The architecture of the circuit 70 is implemented using a Wallace Tree multiplier to reduce the design area. The Wallace Tree multiplier reduces design area by using shifts and add combinations to provide the multiplications in the filter taps. The circuit 70 design is compact. However, the circuit 70 has the disadvantages of (i) being fixed to two sets of coefficients, and (ii) the coefficients cannot be changed without a major redesign of the whole filter circuit 10. When the filter circuit 70 is disabled, the output is taken from the center tap position (i.e., position tap4).

Referring to FIG. 5, a block diagram of a circuit 80 illustrating a horizontal phase accumulator section of the horizontal filter circuit 32 is shown. The horizontal filter scaling is programmed by an 8-bit scale factor. The 8-bit scale factor is used with a phase accumulator 80 to determine which of the 8 phases to use in the filter taps. Separate phase accumulators 80 are included for luma (i.e., Y), and both chroma components (i.e., Cb and Cr). When the circuit 10 is scaling 1:1, the scale factor for the phase accumulators 80 is set to 256.

It would be desirable to have a video horizontal and vertical scaling filter with variable scaling, flexible scaling factors, and/or reduced memory bandwidth.

SUMMARY OF THE INVENTION

The present invention concerns an apparatus for variably scaling video picture signals comprising a first circuit and a second circuit. The first circuit may be configured to generate one or more data signals vertically scaled to a first value in response to (i) the video picture signals and (ii) one or more control signals. The second circuit may be configured to generate one or more output signals horizontally scaled to a second value in response to (i) the one or more data signals and (ii) the one or more control signals. The first value and the second value are independently selectable.

The objects, features and advantages of the present invention include providing a method and/or architecture for implementing a video horizontal and vertical variable scaling filter for a single chip MPEG-2 decoder that may (i) provide flexible video scaling, (ii) provide all scaling values between 0.25 times and 4.0 times an original picture, (iii) have reduced memory bandwidth, and/or (iv) not require separate programming to define the picture width read from SDRAM.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 6:
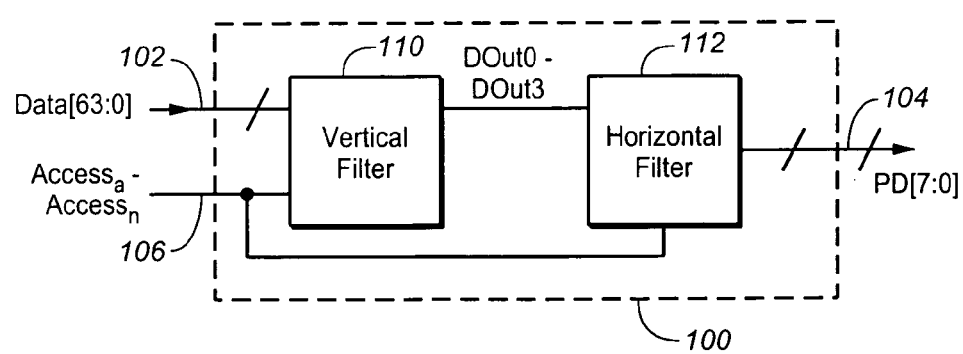
FIG. 6 is a block diagram of a preferred embodiment of the present invention.

Referring to FIG. 6, a block diagram of a circuit 100 is shown in accordance with a preferred embodiment of the present invention. The circuit 100 may be implemented as a video vertical and horizontal variable scaling filter for a single-chip MPEG-2 decoder. The vertical and horizontal scaling values may be independently selectable (e.g., the same or different value). In one example, the circuit 100 may scale output video picture signals to any value in a range of 0.25 times to 4.0 times input video picture signals. However, the circuit 100 may be implemented for scaling other signals, other ranges of values, and/or other encoding types accordingly to meet the design criteria of a particular application. The circuit 100 may have an input 102 that may receive a signal (e.g., DATA[63:0]), an output 104 that may present a signal (e.g., PD[7:0]), and an input/output 106 that may receive/present one or more signals (e.g., ACCESSa–ACCESSn). In one example, the signal DATA [63:0] may be a 64-bit bus of 8-bit wide component video signal. The signal PD[7:0] may be an 8-bit wide, bus of pixel data for a scaled picture. The signals ACCESSa–ACCESSn may include SDRAM control and/or data signals that may be received by/presented to a SDRAM controller (not shown) as detailed below. In one example, the circuit 100 may be timed by a 27 MHz system clock (not shown).

The circuit 100 generally comprises a circuit 110 and a circuit 112. In one example, the circuit 110 may be a vertical filter circuit. The circuit 112 may be a horizontal filter circuit. The circuit 110 may have an input that may receive the signal DATA[63:0], an input/output that may receive/present the signals ACCESSa–ACCESSn, and an output that may present one or more signals (e.g., DOUT0–DOUT3). The circuit 110 may be serially coupled to the circuit 112. The signals DOUT0–DOUT3 may be vertically scaled pixels (pels) that may be presented to an input of the horizontal filter 112. The circuit 112 may have an input/output that may receive/present the signals ACCESSa–ACCESSn and an output that may present the signal PD[7:0].

Figure 7:
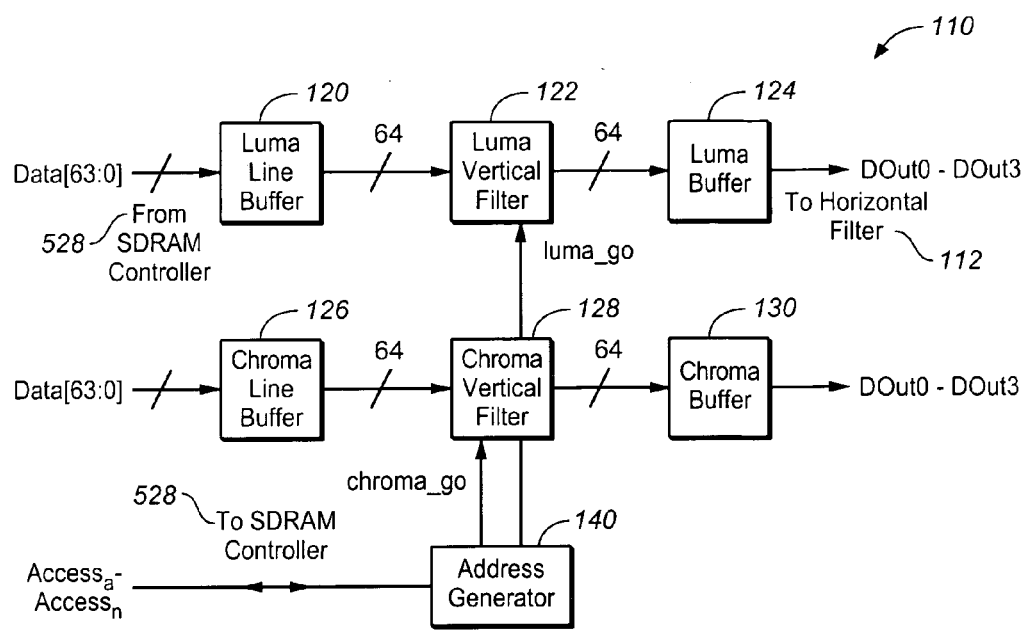
FIG. 7 is a block diagram of a vertical filter of the present invention.

Referring to FIG. 7, a block diagram illustrating the circuit 110 is shown. The circuit 110 generally comprises a circuit 120, a circuit 122, a circuit 124, a circuit 126, a circuit 128, a circuit 130, and a circuit 140. The circuits 120 and 126 may have inputs that may receive the signal DATA[63: 0]. The circuits 124 and 130 may have outputs that may present the signals DOUT0–DOUT3. The circuit 140 may have an input/output that may receive/present the signals ACCESSa–ACCESSn, an output that may present a signal (e.g., LUMA_GO) to an input of the vertical luma filter circuit 122, and an output that may present a signal (e.g., CHROMA_GO) to an input of the vertical chroma filter circuit 128. The signals LUMA_GO and CHROMA_GO may be control signals. The circuits 122 and 128 may vertically scale a line in response to the signals LUMA_GO and CHROMA_GO.

The circuits 120, 122 and 124 may be serially connected. The circuits 126, 128, and 130 may be serially connected. In one example, the circuit 120 may be a luma line buffer circuit. The circuit 122 may be a vertical luma filter circuit. The circuit 126 may be a chroma line buffer circuit. The luma line buffer circuit 120 and the chroma line buffer circuit 126 may be linestores. The circuit 128 may be a vertical chroma filter circuit. The circuit 130 may be a chroma buffer circuit. The circuit 140 may be an address generator circuit. A circuit (or module, not shown) may be connected between the circuit 100 and a host interface (not shown) The module may comprise display registers and/or interfaces.

Figure 8:
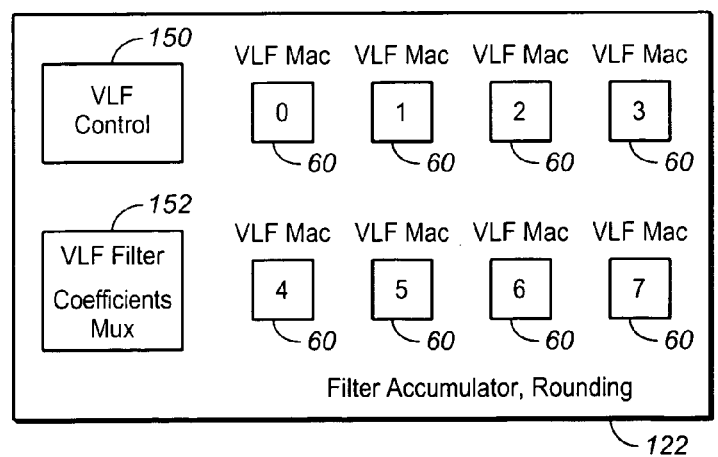
FIG. 8 is a block diagram of a luma vertical filter design partitioning.

Referring to FIG. 8, a block diagram of a design partitioning of the luma vertical filter 122 is shown. The vertical luma filter circuit 122 generally comprises the main FIR filters. The main FIR filters may comprise a main filter controller 150, a coefficient multiplexer 152, and one or more filters in the form of multiply accumulate cells 60.

The chroma vertical filter 128 may be implemented comprising one or more multiply accumulate cells 60 similarly to the luma vertical filter 122. The circuit 100 may eliminate the horizontal decimation filters 23 and 29 compared with the circuit 10.

Figure 9A:
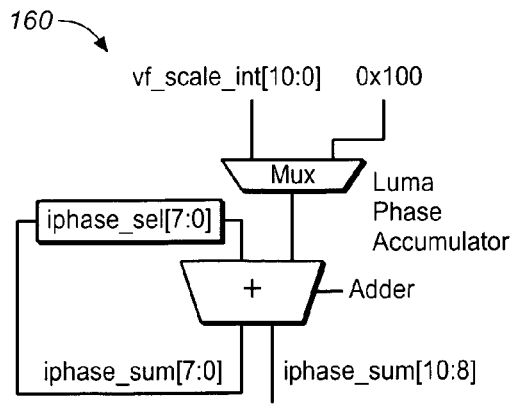
FIGS. 9(a–b) are block diagrams of luma and chroma vertical phase accumulators.
Figure 9B:
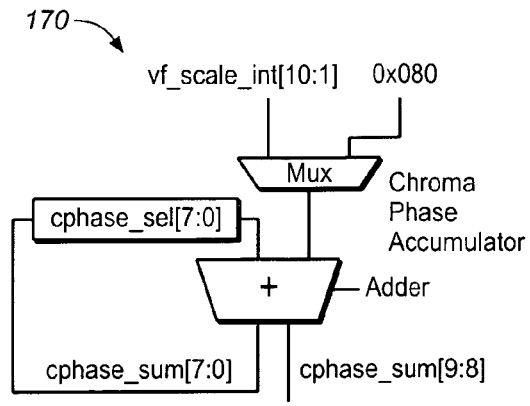

Referring to FIGS. 9(*a–b*), block diagrams of luma and chroma vertical phase accumulators 160 and 170, respectively, are shown. Conventional display modes use fixed coefficients for the vertical filtering. The circuit 100 may implement programmable modes having user programmable control for the vertical filter circuit 110. In one example, an 11-bit scale factor may be implemented to define the scale and coefficients used for the particular scale setting. However, other sized scale factors may be implemented accordingly to meet the design criteria of a particular application.

The luma and chroma vertical filters 122 and 128 generally have separate phase accumulators (e.g., the phase accumulators 160 and 170, respectively). For the luma filter 122 a scaling signal (e.g., VF_SCALE_INT[10:0]) may vary in a range of a maximum value of 0×400 to a minimum value of 0×040. When the register value for the picture scaling is zero, the scale factor (e.g., the signal VF_SCALE_INT[10:0]) is generally set to 0×100 and results in a scaling of 1.0. A similar procedure may be implemented for the chroma phase accumulator 170. For the luma filter 122, the registered value of a signal (e.g., LPHASE_SEL[7:5]) may be used to select the nearest coefficient for the vertical luma line. A signal (e.g., LPHASE_SUM[10:8]) from the adder output may be used to define the number of lines to reload into the linestore for the next filtered line. An example of output from the luma phase accumulator 160 is shown in TABLE 1 below:

TABLE 1

| LPHASE_SUM[10:8] | LPHASE_SUM[7:0] |
|---|---|
| linestore reload | phase selection |

The signal LPHASE_SUM[10:8] is generally preloaded to a counter in the filter controller circuit 150. The filter controller 150 counter generally keeps a count of the number of lines to be loaded into the linestore 120. The filter controller 150 counter may decrement every time a new line is loaded. When the filter controller 150 counter reaches zero, a signal (e.g., LBANK_READS_AT_ZERO) may be asserted at a digital high (e.g., on or "1") to indicate that the preload process is complete. The output signals presented by the chroma phase accumulator 170 may be generated similarly to the luma phase accumulator 160 output signals. The linestores (e.g., the luma line buffer circuit 120 and the chroma line buffer circuit 126) generally reload the banks of the circuits 122 and 128 in the sequence 0 to 3 for luma (or 0 to 1 for chroma) and then wrap around. However, the line corresponding to tap 0 of the 4-tap filter luma filter may not be the first position in the linestore 120 memory. Counters may be implemented in the filter controller 150 to help ensure that the line corresponding to tap 0 of the 4-tap luma filter is in the first position in the linestore 120 memory.

Figure 10:
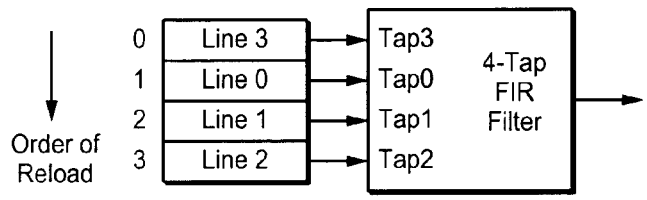
FIG. 10 is a block diagram of exemplary luma linestore positions.

Referring to FIG. 10, a block diagram 180 of exemplary luma linestore positions is shown. Counters of increments of signals (e.g., LBANK_SEL_COUNT and CBANK_SEL_COUNT) may hold the positions of the current luma and chroma bank, respectively, written to. The signals LBANK_SEL_COUNT and CBANK_SEL_COUNT may increment after each reload and reset to 0 after bank 3 is loaded. Each tap of the 4-tap FIR filter may have a signal (e.g., LBANK_POS_COUNT or CBANK_POS_COUNT) to indicate the linestore position that may be read from.

The multiplexer module 152 (and the corresponding multiplexer module in the chroma filter circuit 128) may select the appropriate coefficient phase to be presented to the luma and chroma FIR filters from phase signals (e.g., VLF_PHASE and VCF_PHASE). In the luma filter 122, new display modes (e.g., display modes 12 and 13) may use a new phase-type (e.g., VLF_PROG) programmed in the filter circuit 122 phase multiplexer.

The new programming may allow the programmable coefficients to be selected by a signal (e.g., LPHASE_SEL). A vertical filter select bit (e.g., VFSEL) may select the soft or sharp filter coefficients. Similar programming and/or circuits may be implemented for the chroma filter 128. Example luma and chroma filter coefficients are shown in TABLES 2–5 below:

TABLE 2

| Phase | C0 | C1 | C2 | C3 | C4 | C5 | C6 | C7 |
|---|---|---|---|---|---|---|---|---|
| 0 | −18 | −38 | −53 | −52 | −44 | −34 | −20 | −9 |
| 1 | 250 | 240 | 218 | 180 | 135 | 88 | 44 | 9 |
| 2 | 44 | 88 | 135 | 180 | 218 | 240 | 251 | 247 |
| 3 | −20 | −34 | −44 | −52 | −53 | −38 | −18 | 9 |

TABLE 2 generally shows luma filter coefficients for a soft filter implementation of the circuit 100.

TABLE 3

| Phase | C0 | C1 | C2 | C3 | C4 | C5 | C6 | C7 |
|---|---|---|---|---|---|---|---|---|
| 0 | 35 | 21 | 12 | 5 | 1 | −1 | −2 | −2 |
| 1 | 147 | 143 | 132 | 118 | 103 | 87 | 69 | 52 |
| 2 | 74 | 92 | 110 | 126 | 137 | 146 | 152 | 151 |
| 3 | 0 | 0 | 2 | 7 | 15 | 24 | 37 | 55 |

TABLE 3 generally shows luma filter coefficients for a sharp filter implementation of the circuit 100.

TABLE 4

| Phase | C0  | C1  |
|-------|-----|-----|
| 0     | ¼   | ¾   |
| 1     | ¾   | ¼   |

TABLE 4 generally shows chroma filter coefficients for the display mode 12 implementation of the circuit 100.

TABLE 5

| Phase | C0  | C1  | C2  | C3  |
|-------|-----|-----|-----|-----|
| 0     | ⅛   | ⅜   | ⅝   | ⅞   |
| 1     | ⅞   | ⅝   | ⅜   | ⅛   |

TABLE 5 generally shows chroma filter coefficients for the display mode 13 implementation of the circuit 100. However, other luma and/or chroma filter coefficients may be implemented accordingly to meet the design criteria of a particular application.

Figure 11:
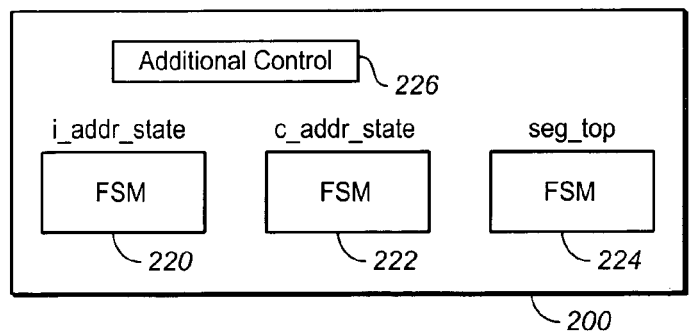
FIG. 11 is a block diagram of an address generator circuit.

Referring to FIG. 11, a block diagram 200 of hierarchy of the address generator circuit 140 is shown. The address generator circuit 140 generally provides an interface to read data from the SDRAM. The module 200 may be subdivided into the main finite state machine (FSM) controls for luma (e.g., block 220), for chroma (e.g., block 222), a segment allocator (e.g., block 224), and additional control (e.g., block 226). A segment allocator block similar to the circuit 224 is configured to implement a reduced memory mode (e.g., 2.5 times frame decoding) in the conventional design.

The circuit 140 generally performs several address calculations that are different for interlaced and for progressive pictures. In one example, the circuit 100 may implement new display modes: a progressive display mode 12 and an interlaced display mode 13.

The circuit 100 may also implement a 'linedrop' feature to enable 0.25 times vertical scaling. Vertical scaling of 0.25 times may be implemented by not receiving alternate lines at the input to the vertical filter circuit 110. At the end of every line the SDRAM address may increment to the start of the next line in memory. The SDRAM generally saves the pictures in a raster frame format. The SDRAM address increments are generally (i) a single line increment when reading a progressive picture and (ii) a double line increment when reading an interlaced picture. When the 'linedrop' mode bit (e.g., FLTR_LINEDROP) is set, the existing line increments are generally doubled. The luma and chroma FSM modules 220 and 222 may control the addresses to read data into the circuit 100 linestores 120 and 126. Signals (e.g., LUMA_PEL_PTR and CHROMA_PEL_PTR) may be used to form this control address. The FSM modules 220 and 222 may be configured to implement the variable scaling feature of the circuit 100.

Figure 12:
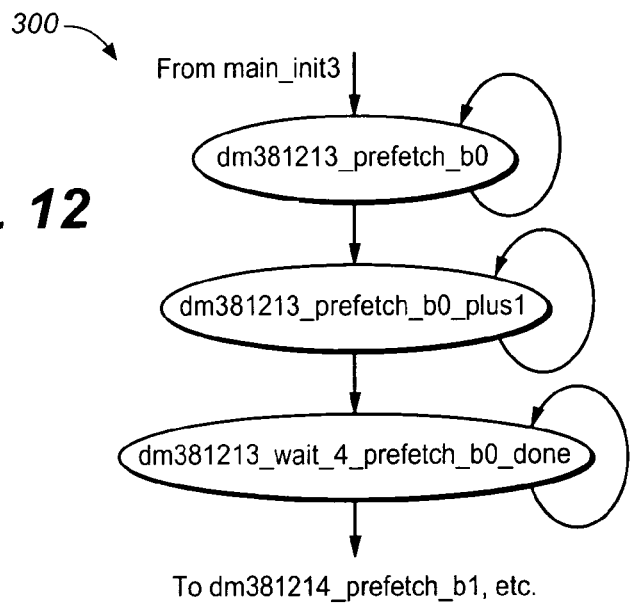
FIG. 12 is a state diagram of a line buffer preload of the present invention.

Referring to FIG. 12, a state diagram 300 illustrating an operation topology of a linestore preload of the present invention is shown. In one example, the luma address FSM 220 may be a large finite-state-machine of 130 states. However, other sized state machines may be implemented accordingly to meet the design criteria of a particular application. In one example, the FSM 220 may be implemented having a common section plus separate sections for each of the 11 display modes.

The circuit 110 generally scales the input picture in modes 3, 8 and 11. The FSM 220 generally splits the input picture into sections for modes 3 and 8 for 75% scaling and mode 11 for 50% scaling. The sections of the FSM 220 may control the address generation and read requests to the SDRAM controller. In the modes 3, 8 and 11 the FSM 220 may directly specify the number of lines to read into the linestore 120 before each operation of the circuit 100. The FSM 220 state may also define the coefficient selection for the circuit 100.

In the new display modes 12 and 13 a single new section may be defined in the FSM 220. The new section in the FSM 220 may reuse some of the existing states to interface with the SDRAM controller. The new display modes 12 and 13 may have the advantages of (i) being programmable and (ii) having the number of new lines to read provided by the phase incrementor in VLF control 150.

Some of the FSM 220 states may be common to all of the display modes of the circuit 100. However, a section of the FSM 220 may have modifications in a state (e.g., MAIN_VPS_INIT) to select the line address increment in a signal (e.g., L_PEL_SEL) for the new modes 12 and 13. In an initial state (e.g., MAIN_INIT3) the signal L_PEL_SEL may also increment by one line when displaying the bottom field of an interlaced picture in mode 13. The state MAIN_INIT3 may then move to the linestore preload. The linestore preload may be common with the existing mode 3 and 8 section of the FSM 220.

The states corresponding to the modes 3 and 8 generally preload the first 4 lines into the linestores 120 and 126. In one example, the first state of the preload operation may be DM381213_PREFTCH_B0. The state DM381213_PREFTCH_B0 may select bank 0 and present a luma read request to the SDRAM controller. The state DM381213_PREFTCH_B0 may wait for a signal (e.g., DR_OK_TO_LD) to be presented by the SDRAM controller. The signal DR_OK_TO_LD may indicate the request has been accepted. On receipt of the signal DR_OK_TO_LD the state DM381213_PREFTCH_B0 may update the address by one pel position and present another read request to the SDRAM controller.

The state DM381213_PREFTCH_B0 may continue to read a complete line of pels from the SDRAM. When an end of line signal (e.g., END_OF_LINE) is received from a timing generator (not shown), the state DM381213_PREFTCH_B0 may move to the next state (e.g., DM381213_PREFTCH_B0_PLUS1).

The state DM381213_PREFTCH_B0_PLUS1 may perform a single read from SDRAM and update the start address to the beginning of the next line. In the progressive mode 12 a single line address increment may be implemented. However, in mode 13 the line address generally increments by a double line as the framestore format contains both fields. The state DM381213_WAIT_4_PREFTCH_B0_DONE may wait for all the pel reads to complete. The completion of the pel reads may be indicated by a signal (e.g., LLINE_RDS_DONE). The FSM 220 may move to state DM381213_WAIT_2_PREFTCH_B1 to repeat the process for bank 1. Similar processing may be implemented for banks 2 and 3. The state DM381213_WAIT_4-PREFTCH_B3_DONE may move to the new section for the modes 12 and 13. Generally for the modes 12 and 13 the FSM 220 moves to state DM1213_FLTR_1STLN to filter the first line. However, in some conditions (e.g., conditions where there is a field inversion) the linestores 120 and 126 may reload and the FSM 220 may move to the state DM1213_WAIT_2_RD_BN.

Figure 13:
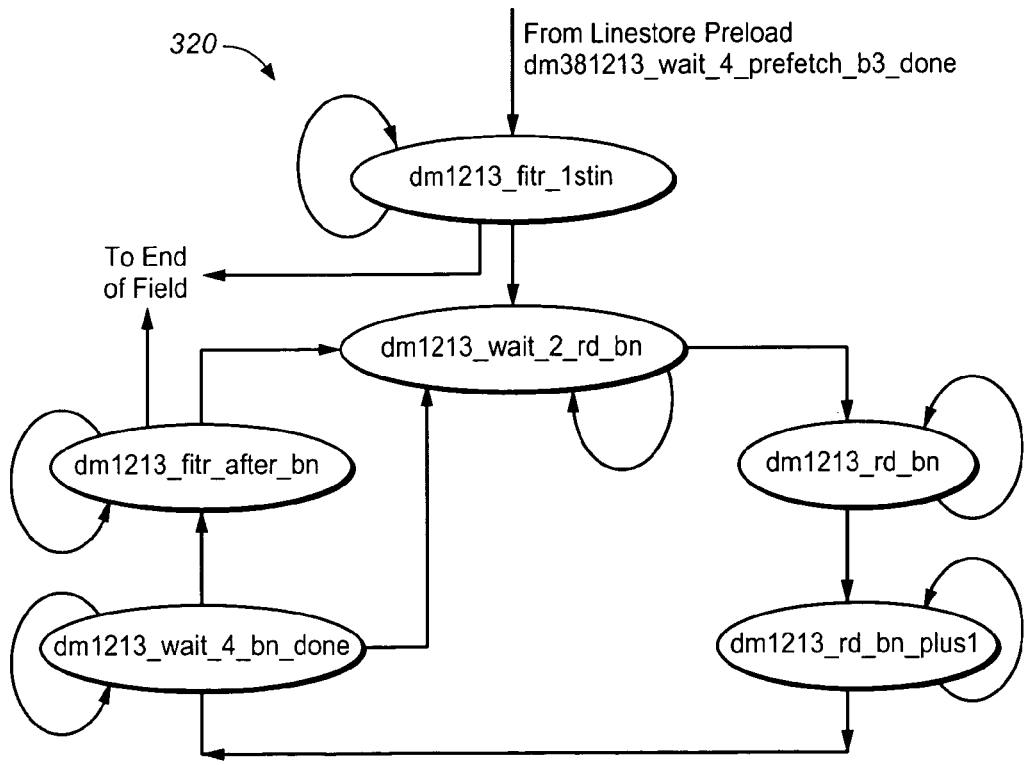
FIG. 13 is a state diagram of a reload of the present invention.

Referring to FIG. 13, a state diagram 320 illustrating an operation topology of a reload operation of the present invention is shown. The simplified state diagram 320 shows an example of the reload states for the luma address state machine 220.

A state (e.g., DM1213_FLTR__1STLN) may (i) define the coefficient settings used in the circuit 100 and (ii) enable the vertical filter circuit 110 for one line by presenting a signal (e.g., I_VLF_GO). When the circuit 110 completes a filter operation, a signal (e.g., VLF_DONE) may be set. The state DM1213_FLTR__1STLN then may move to the state DM1213_WAIT__2_RD_BN.

The state DM1213_WAIT__2_RD_BN may be the first state that performs the linestore reloads for the new modes 12 and 13. The linestore reload for the modes 12 and 13 may be similar to the preload states described in connection with FIG. 12. However, the number of reload may be variable depending on the values asserted by the phase accumulator 160. The state DM1213_WAIT__2_RD_BN is generally initiated by asserting a control signal (e.g., LUMA_REQ) and waiting for the address generator 140 to assert the control signal LUMA_GO. The next state DM1213_RD_BN may be initiated by the FSM 220 selecting the linestore bank in response to the signal LBANK_SELECT and presenting a read request to the SDRAM controller using the first address corresponding to the selected line. The state DM1213_WAIT__2_RD_BN may wait for the SDRAM controller to assert a signal (e.g., DR_OK_TO_LD). The signal DR_OK_TO_LD may indicate the request read has been accepted. When the signal DR_OK_TO_LD is received, the state DM1213_WAIT__2_RD_BN may update the address by one pel position and present another read request to the SDRAM controller. The state DM1213_WAIT__2_RD_BN may continue to read a complete line of pels from the SDRAM. The state DM1213_WAIT__2_RD_BN may move to the next state (e.g., DM1213_RD_BN_PLUS1) when the signal END_OF_LINE is received from the timing generator.

The state DM1213_RD_BN_PLUS1 generally performs a single read from the SDRAM and updates the start address to the beginning of the next line. In the progressive mode 12 or during a reduced memory mode the update of the start address is generally a single line increment. However, in mode 13 the update of the start address may increment by a double line as the framestore format contains both fields.

The state DM1213_WAIT__4_BN_DONE may wait for all the pel reads to complete. The signal LLINE_RDS_DONE may be generated when all of the pel reads are complete. The state DM1213_WAIT__4_BN_DONE may decrement the signal LBANK_READS and determine if further line reads are required. The state DM1213_WAIT__4_BN_DONE may then return to the state DM1213_RD_BN to load a further line into the linestore 120. When a further line is loaded into the linestore 120, the LBANK_SELECT may be updated to indicate the next position in the linestore.

When the required number of lines have been loaded into the linestore 120, a signal (e.g., LBANK_READS_ZERO) may be set and the FSM 220 may move to a state (e.g., DM1213_FLTR_AFTER_BN). The state DM1213_FLTR_AFTER_BN may define the scale coefficient settings used in the circuit 122 and enable the circuit for one line operation (e.g., the signal I_VLF_GO may be asserted). When the circuit 110 completes the reload operation, the signal VLF_DONE may be asserted. When there are further lines in the field, the phase incrementor may increment and generate the new value for the signal LBANK_READS. The new linestore bank may be set in response to the signal LBANK_SELECT.

When the end of field is determined, the FSM 220 may move to a state (e.g., LUMA_FIELD_COMPLETE). The state LUMA_FIELD_COMPLETE may reset a number of counters in the circuit 100. However, when a top field having a field inversion is loaded, the filter circuit 110 may skip the first line during the preload. As a result, one line is generally added at the end of the field. When one line is added at the end of the field, the FSM 220 may move to a state (e.g., FLTR_LASTLN__4_FI) and filter a single line similarly to the state DM1213_FLTR_AFTER_BN. When the filter circuit 110 is interpolating a picture, the FSM 220 may repeat the state DM1213_FLTR_AFTER_BN several times for each linestore load. The state DM1213_FLTR_AFTER_BN may be repeated as long as the signal LBANK_READS counter is zero (e.g., the signal LBANK_READS_ZERO is set).

The chroma address FSM 222 may be implemented as a large state machine similarly to the luma FSM 220. The FSM 222 may implement extra states similarly to the extra states that may be implemented in the luma FSM 220.

Figure 14:
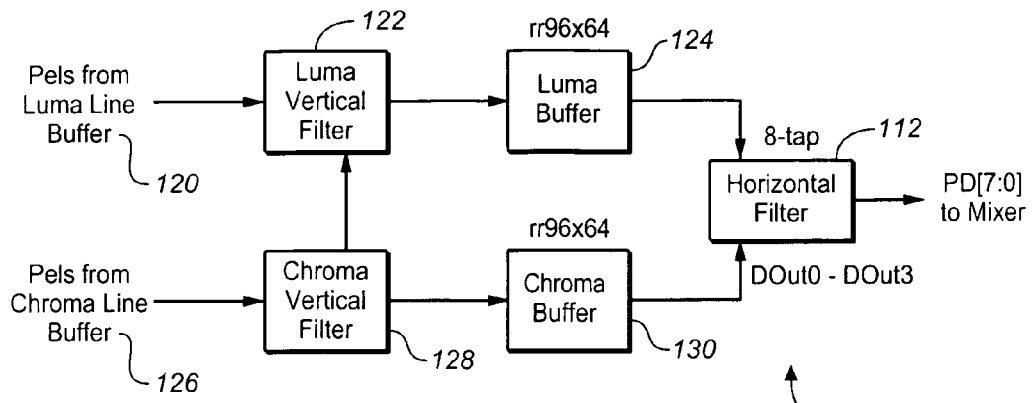
FIG. 14 is a block diagram of luma and chroma buffers.

Referring to FIG. 14, a block diagram illustrating the luma buffer 124 and the chroma buffer 130 in the context of the circuit 100 is shown. In one example, the luma buffer 124 and the chroma buffer 130 may be implemented as complete line length buffers (e.g., 96×64 bit buffers). However, other buffer lengths may be implemented accordingly to meet the design criteria of a particular application. The output pels from the luma vertical filter 122 and the chroma vertical filter 130 may be buffered by the luma buffer 124 and the chroma buffer 130, respectively, before the pels are presented to the horizontal filter 112.

Figure 15:
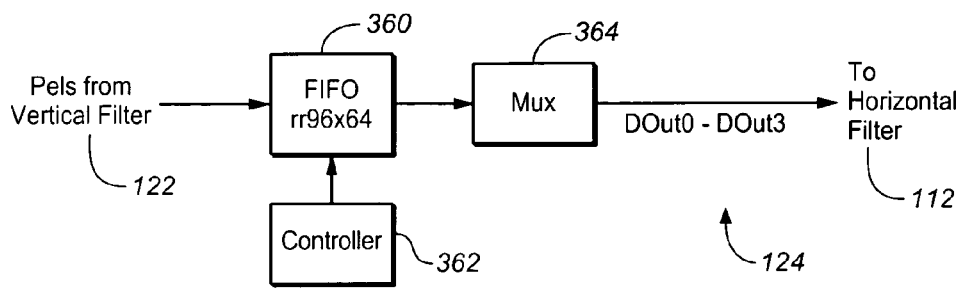
FIG. 15 is a detailed block diagram of the luma buffer of FIG. 14.

Referring to FIG. 15, a detailed block diagram of the luma buffer circuit 124 of FIG. 14 is shown. The luma buffer circuit 124 generally comprises a FIFO 360, a luma buffer controller 362, and a luma buffer multiplexer 364. The FIFO memory 360 may be controlled by the luma buffer controller 362. The data (pels) may be read into the luma buffer multiplexer 364. The luma buffer multiplexer 364 may be configured to select the next pel to be presented to the horizontal filter 112.

Figure 16:
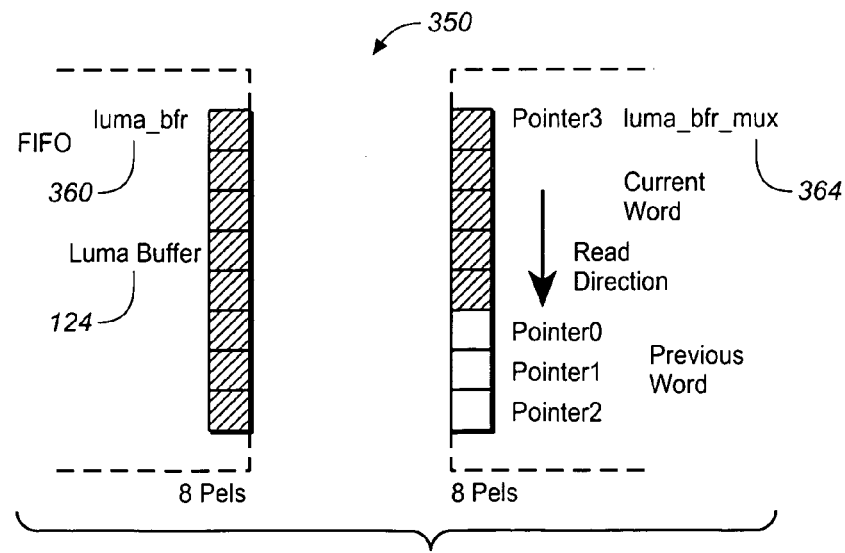
FIG. 16 is a block diagram of luma buffer stored output words.

Referring to FIG. 16, a block diagram 380 of output words stored in luma buffer 124 is shown. The new decimating modes of the horizontal filter 112 may be implemented with up to 4 pels read into the filter 112 on every clock cycle. The luma buffer multiplexer 364 may read and store a complete word presented by the luma buffer FIFO 360 in advance. In one example, the data from the FIFO 360 may be 64-bits (e.g., 8 pels) wide. The timing of the reads from the FIFO 360 may keep the flow of data in the circuit 100 constant and/or without any interruptions. The timing of the reads from the FIFO 360 may be implemented using pointers (e.g., POINTER0–POINTER3) to the current and the next 4 pel positions within the word stored in the FIFO 360. When the read pointer has passed over a particular pel location, the next available pel is stored in that register location in the FIFO 360. When the last pel is transferred to the store register, a flag (e.g., FIFO_POP) may be set and the next word may be presented by the output of the luma buffer FIFO 360. The read pointers POINTER0–POINTER3 may move in a circular motion wrapping around the locations of the 8 pel word. At each clock cycle the current and next 4 pels may be multiplexed and presented as the signals DOUT0, DOUT1, DOUT2 AND DOUT3.

The luma buffer controller 362 may be configured to keep track of the read and write locations in the buffer FIFO 360.

A counter value (e.g., LUMA_WRITE_PTR) may be the write location and a counter value (e.g., LUMA_READ_PTR) may be the read location in the FIFO 360. The horizontal filter 112 generally presents data (e.g., the signal PD[7:0]) or the display output may be corrupted. When the horizontal filter 112 is scaling down to 0.25 times the input picture, the display output demand is generally the greatest.

The control of the circuit 100 may be configured to de-couple the reading and writing processes so the FIFO 360 will not underflow. The luma buffer circuit 124 may be configured to prevent the write to the FIFO 360 overtaking the read from the FIFO 360. In one example, the vertical filter 122 may be configured to write to the FIFO 360 until the write location LUMA_WRITE_PTR is 2 locations behind the read location LUMA_READ_PTR. When the write location LUMA_WRITE_PTR is 2 locations behind the read location LUMA_READ_PTR, the vertical luma filter circuit 122 may stop until more locations in the FIFO 360 become available.

In this example, a signal (e.g., LUMA_FULL) may be set when no free space is available in the FIFO 360. When the signal LUMA_FULL is set, the signal LUMA_FULL may be a control signal to disable the vertical filter 122.

Figure 1:
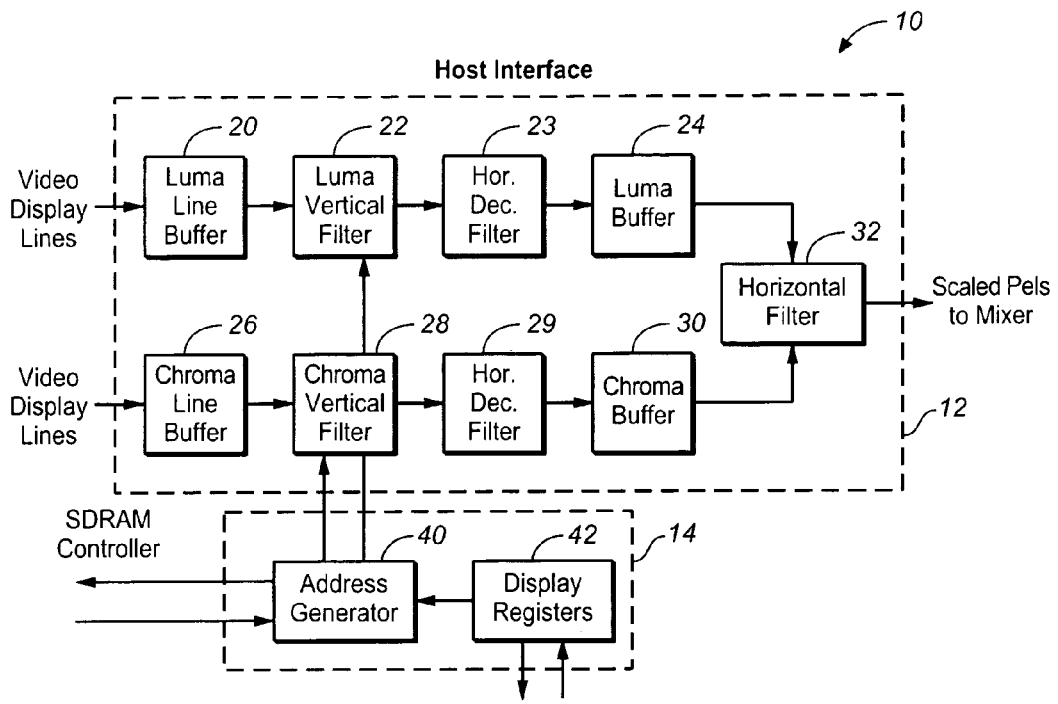
FIG. 1 is a block diagram of a scaled video filter.
Figure 2:
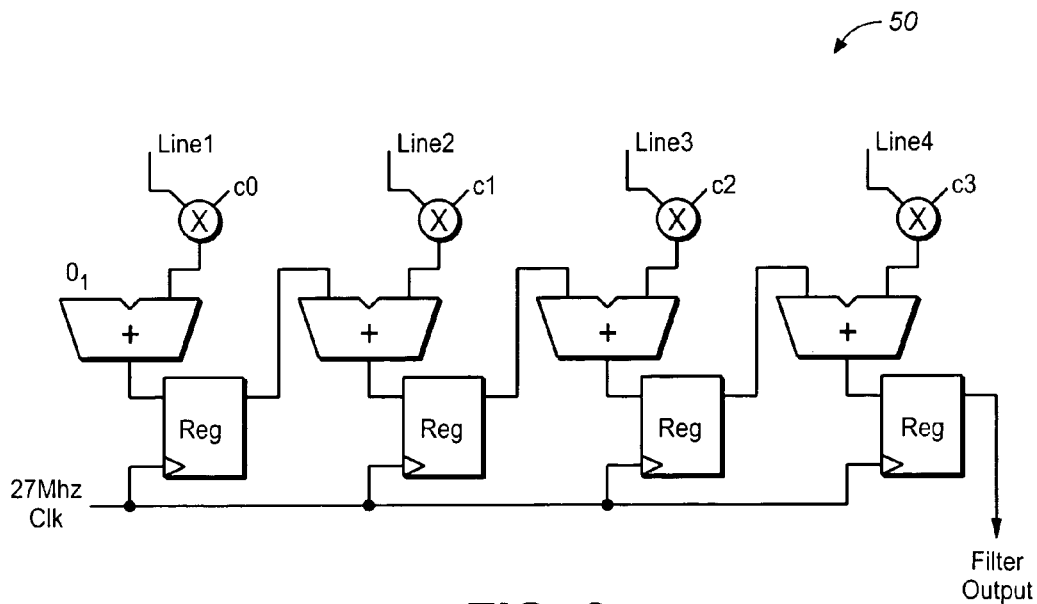
FIG. 2 is a block diagram of an exemplary FIR filter.
Figure 3:
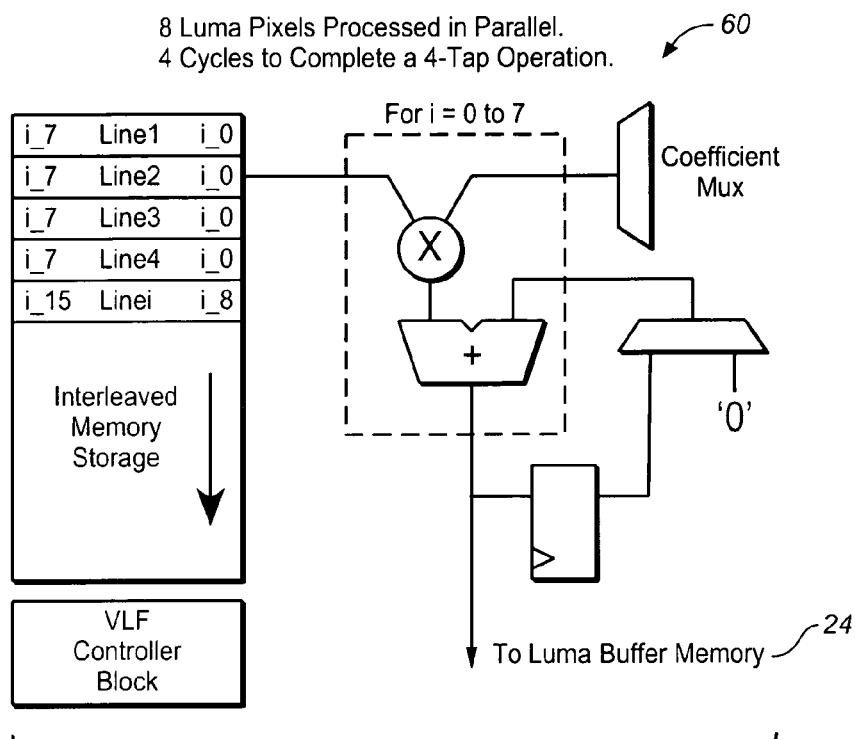
FIG. 3 is a block diagram of a multiply-accumulate cell.
Figure 4:
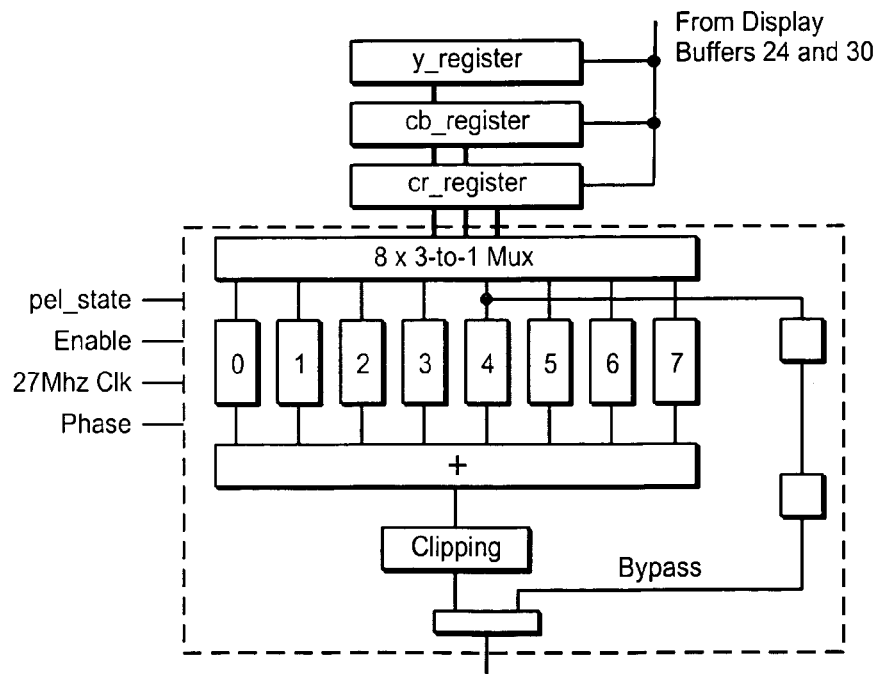
FIG. 4 is a block diagram of a horizontal interpolating filter.
Figure 5:
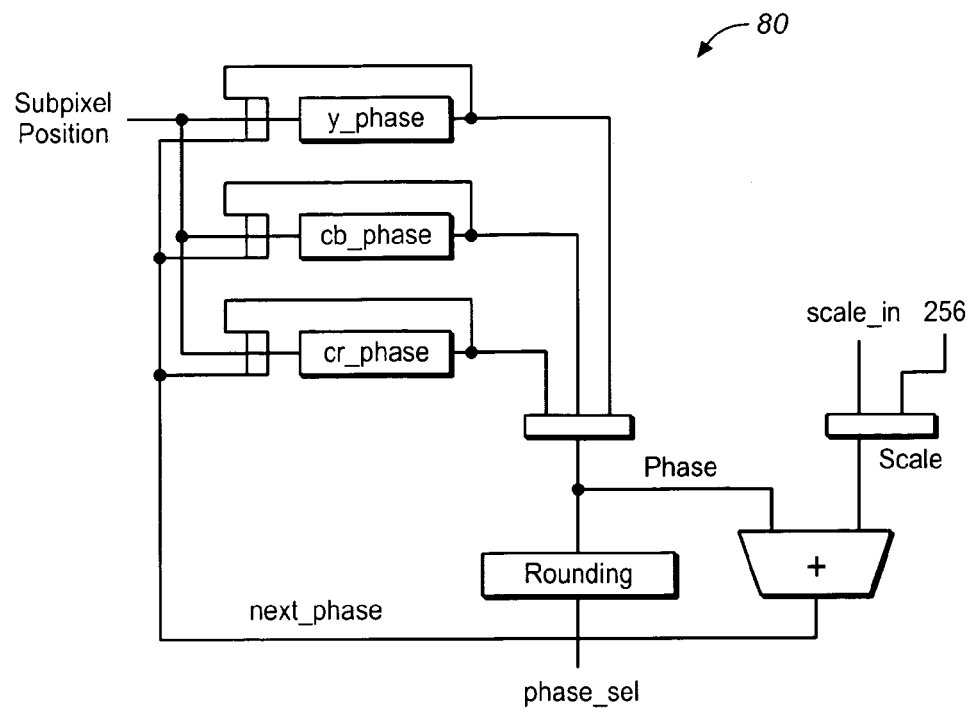
FIG. 5 is a block diagram of phase accumulators.

In conventional MPEG-2 video scaling circuits such as the filter 10 of FIG. 1, programming the 'Main Reads per Line' register is required to define the width of a picture read out from SDRAM and displayed on the screen. When scaling a picture with a conventional design filter, the 'Main Reads per Line' register value needs changing when a scaled picture is not all displayed on the screen. The conventional requirement to adjust the value for programming the 'Main Reads per Line' register value can cause confusion. However, in the present invention a signal (e.g., WIDTH_INCREMENT) may enable a counter to automatically adjust the buffer line increment to the value set in 'Main Reads per Line,' regardless of how many pels have been read out from the luma buffer 124. The circuit 100 implementation using the buffer line increment counter to automatically adjust the buffer line address increment may allow the 'Main Reads per Line' register to stay at the maximum width of the picture and not require adjustment and/or separate programming for different scale values. The circuit 100 may automatically reset a starting address of a display line when an end of the display line is not displayed (e.g., when some of the picture is not displayed).

An additional function in the controller 362 may be tracking the pointer location in the stored output word. The pointer may be stored in a counter implemented in the controller 362. The pointer may wrap around the locations in the stored word. The increment value to the stored word counter may be determined by a signal (e.g., Y_REQ). The signal Y_REQ may indicate the shift in pel positions in the horizontal filter 112. When the stored word pointer counter wraps around, the signal LUMA_POP may be asserted as a digital high. The pel may be read from the FIFO 360 in response to the assertion of the signal LUMA_POP.

Figure 17:
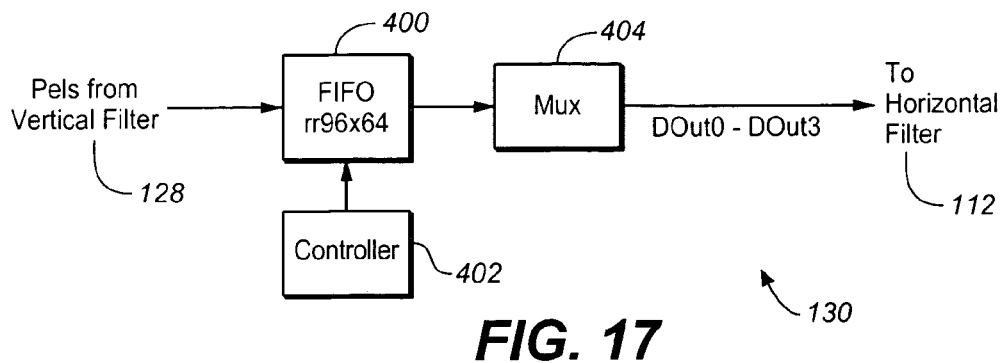
FIG. 17 is a block diagram the chroma buffer of FIG. 14.

Referring to FIG. 17, a block diagram illustrating the chroma buffer 130 of FIG. 14 is shown. The organization of the chroma buffer 130 may be similar to the luma buffer 124 organization. A FIFO memory 400 may be controlled by a controller 402 and the data (pels) may be read into a multiplexer 404. The circuit 130 may select the next pel to go to the horizontal filter 112 and may alternate between Cb and Cr pels.

Figure 18:
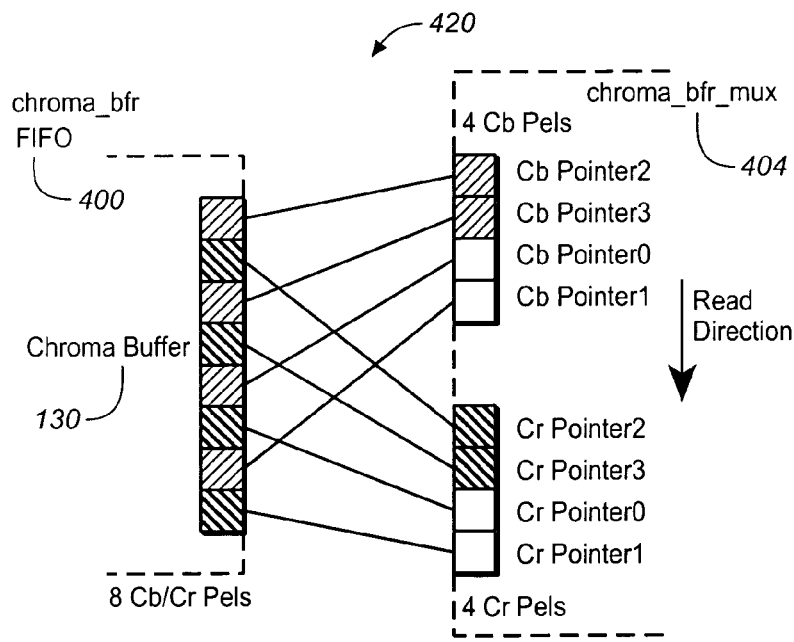
FIG. 18 is a block diagram of chroma stored output words.

Referring to FIG. 18, a block diagram 420 of chroma buffer 130 stored output words is shown. The chroma buffer multiplexer 404 may store output words similarly to the luma buffer multiplexer 364. In the chroma buffer 130 the 8 pel output word from the FIFO 440 generally comprises alternate Cb and Cr pels. The output word may be split into separate Cb and Cr words with pointers to indicate the current and next 4 locations. The next word may be read from the chroma buffer 130 similarly to the read process of the luma buffer 124. The Cb and Cr pointers may wrap around the Cb and Cr pel positions. The output signals DOUT0, DOUT1, DOUT2 and DOUT3 may be multiplexed from either the Cb or Cr pel positions. When a signal (e.g., CB_READ) is set, the Cb pels may be selected. Alternatively the Cr pels may be selected.

The chroma buffer controller 402 may track the read and write locations in the FIFO 400 similarly to the luma controller 362. The write location may be indicated by a signal (e.g., CHROMA_WRITE_PTR) and the read location may be indicated by a signal (e.g., LUMA_READ_PTR). A signal (e.g., CHROMA_FULL) may control enabling and/or disabling the chroma vertical filter 128. The buffer 130 end of line address may be incremented in a counter by the signal WIDTH_INCREMENT similarly to the luma buffer 124. The current position in the Cb and Cr output words may be located in counters in the controller 402. A signal (e.g., CHROMA_POP) may force the next read from the FIFO 400.

Figure 19:
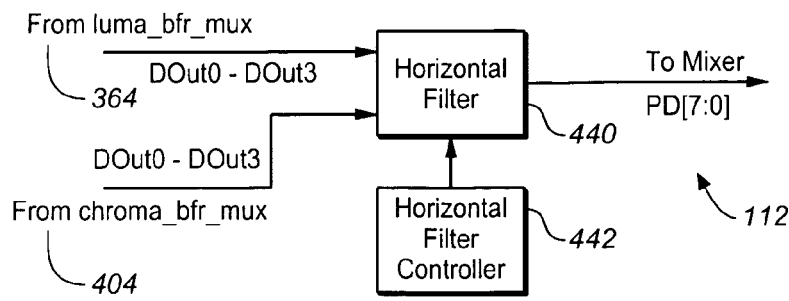
FIG. 19 is a detailed block diagram of the horizontal filter of FIG. 14.

Referring to FIG. 19, a detailed block diagram of the horizontal filter circuit 112 is shown. The horizontal filter 112 generally comprises a filter 440 and a filter controller 442. In one example, the filter 440 may be an 8-tap FIR filter. However, other filter types and/or sizes of filters may be implemented accordingly to meet the design criteria of a particular application.

Figure 20:
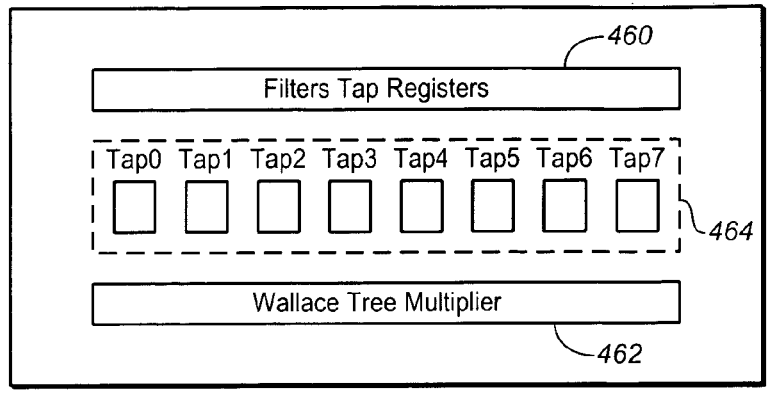
FIG. 20 is a detailed block diagram of the internal filter partitioning of horizontal filter of FIGS. 14 and 19.

Referring to FIG. 20, a detailed block diagram 450 illustrating internal filter partitioning of horizontal filter 440 of FIG. 19 is shown. In one example, the horizontal filter 440 may be further subdivided into filter tap register 460, a Wallace Tree multiplier 462, and a number of taps 464. In one example, the filter 440 may be partitioned into eight taps (e.g., TAP0 to TAP7).

Figure 21:
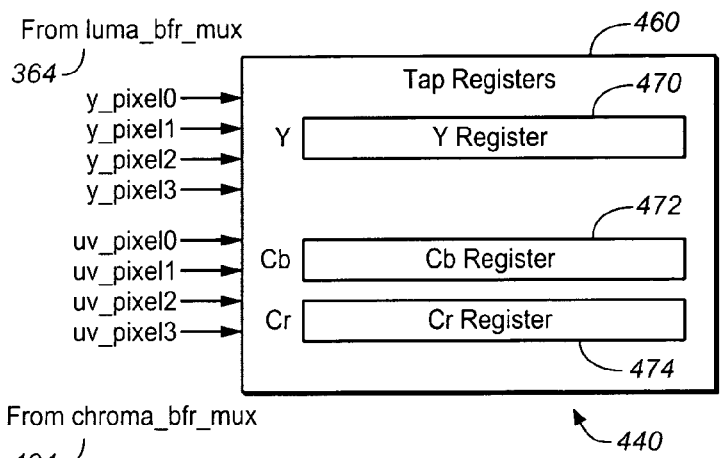
FIG. 21 is a block diagram of the horizontal filter tap register.

Referring to FIG. 21, a block diagram of the tap shift registers of the filter 440 is shown. The filter 440 generally comprises the tap register 460. The tap register 460 may be implemented having three separate registers for Y, Cb and Cr data (e.g., registers 470, 472, and 474, respectively). For every pel appearing on the output of the circuit 112, a phase accumulator 490 (described below in connection with FIG. 23) recalculates the pel that may be presented at the center tap position. Recalculation of the pel presented at the center tap position may be implemented by shifting the data forward in the shift registers 470, 472, and 474. For a scale of 1:1 the data forward shift may be a single shift. When the circuit 112 is interpolating, more than one output pel for each shift of the registers 470, 472, and 474 may be generated by using different coefficient phases for the taps 464. When the filter 112 is decimating, several shifts may be implemented for each pel on the output. The filter 112 may present output data on every cycle of the 27 MHz system clock. All of the forward data shifts are generally implemented in a single cycle. In one example, all forward shifts may be implemented in a single clock cycle by implementation of multiplexers at the inputs of all stages in the shift register 460. The multiplexers at the shift register 460 inputs may enable one register 440 stage to accept data from one of the previous four stages during decimating modes.

Figure 22:
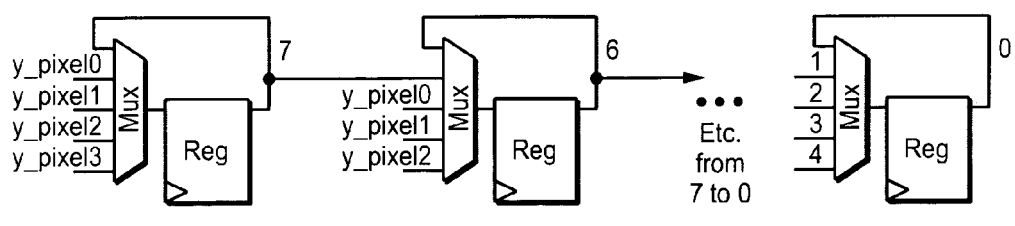
FIG. 22 is a block diagram of a horizontal filter input multiplexer.

Referring to FIG. 22, a block diagram of an input multiplexer 480 is shown. Multiplexers 480 may be implemented at the input stages of the register 460. The first stage of the multiplexer 480 may load from one of the previous four luma multiplexer 364 and/or chroma multiplexer 404 outputs that supply the 4 pels to the filter 112.

Figure 23:
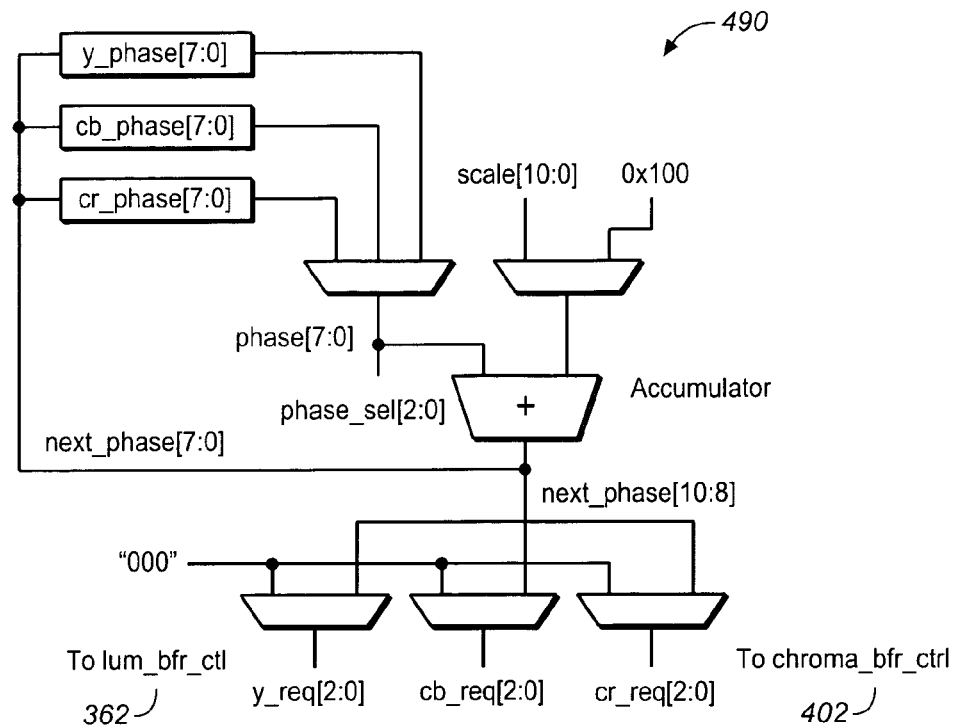
FIG. 23 is a block diagram of horizontal filter phase accumulators.

Referring to FIG. 23, a block diagram of horizontal filter phase accumulators 490 is shown. The horizontal filter control 442 may be implemented using the phase accumulators 490 that may be 11-bits wide. However, other bit-width phase accumulators may be implemented accordingly to meet the design criteria of a particular application. The horizontal filter circuit 112 may decimate and interpolate an input picture.

The phase accumulators 490 may combine the phases for the Y, Cb and Cr components of the input picture. The filter scale register value may be the value of a signal (e.g., SCALE_INT[10:0]). The signal SCALE_INT[10:0] may vary within a range of a maximum value of 0×400 and a minimum value of 0×400. When the register value is zero, the value of the signal SCALE_INT[10:0] may be 0×100 (e.g., a scale of 1.0 times may be implemented). To retain compatibility with the conventional decimation filters 23 and 29, an output signal (e.g., SCALE[10:0]) may be forced to a value 0×200 when a flag (e.g., HDFEN) is set. Setting the flag HDFEN may enable the circuit 112 to be configured to implement a 2:1 decimation of the input picture and the output scaled pels may be similar to the output of the decimation filter 32.

The upper 3 bits of the accumulator 490 in a signal (e.g., NEXT_PHASE[10:8]) may indicate the horizontal shift in pel position to reposition the center tap for the next pel. The value of the signal NEXT_PHASE[10:8] may be multiplexed between signals (e.g., Y_REQ[2:0], CB_REQ[2:0] and CR_REQ[2:0]) depending on the type of pel being filtered (e.g., Y, Cb or Cr). The values of the signals Y_REQ[2:0], CB_REQ[2:0] and CR_REQ[2:0] may indicate the shift to be implemented by the luma buffer controller 362 and the chroma buffer controller 402. The shift values (e.g., the values of the signals Y_REQ [2:0], CB_REQ [2:0] and CR_REQ [2:0]) may also be multiplexed onto signals (e.g., Y_SHIFT[2:0], CB_SHIF[2:0] and CR_SHIFT[2:0]) to control the shift register selection in the tap register 460. The upper 3 bits of the phase registers in the accumulator 490 may be indicated by a signal (e.g., PHASE_SEL[2:0]). The signal PHASE_SEL[2:0] may select the closest coefficient for the 8 taps of the horizontal filter circuit 112. An example output of the phase accumulator 490 is shown in TABLE 6 below:

TABLE 6

| NEXT_PHASE[10:8] | NEXT_PHASE[7:0] |
|---|---|
| register shifts | phase selection |

Two counters may be implemented in the horizontal filter controller 442 to count the number of pels filtered. The implementation of the two counters to count the number of pels filtered may enable the filter controller 442 to stop loading new data at the end of the line.

Figure 24:
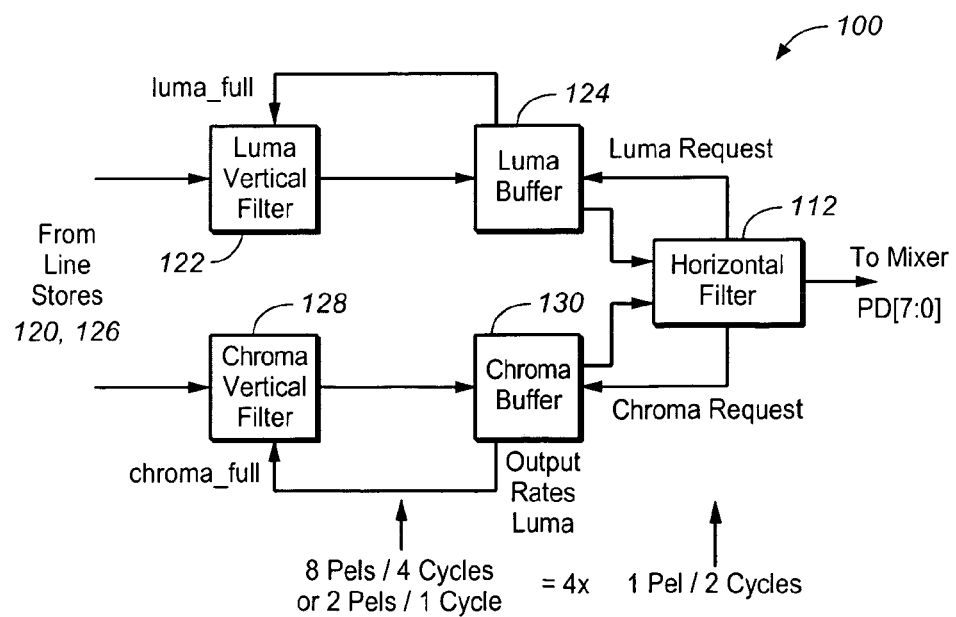
FIG. 24 is a block diagram of an exemplary filter scaling by 1.0.

Referring to FIG. 24, a block diagram of an exemplary filter scaling of 1.0 times using the circuit 100 is shown. The vertical filter circuit 110 may present pels at a fixed rate of 8 pels per 4 clock cycles. The circuit 110 may operate one line ahead of the horizontal filter circuit 112. The filters 122 and 128 may fill up the luma and chroma buffers 124 and 130. When the buffers 124 and 130 are full, the horizontal filter 112 may stop receiving pels. The horizontal filter 112 may remove data (e.g., pels DOUT0–DOUT3) from the buffers 124 and 130. Removal of pels from the buffers 124 and 130 may allow the circuit 110 to start again. The horizontal filter circuit 112 may control the demand to the vertical filter circuit 110 by keeping the luma and chroma buffers 124 and 130 full. The maximum demand of the horizontal filter 112 may be 1 pel per 2 clock cycles (e.g., a quarter of the rate of the vertical filter 110). The vertical filter 110 may pause when the horizontal filter 112 is full.

Figure 25:
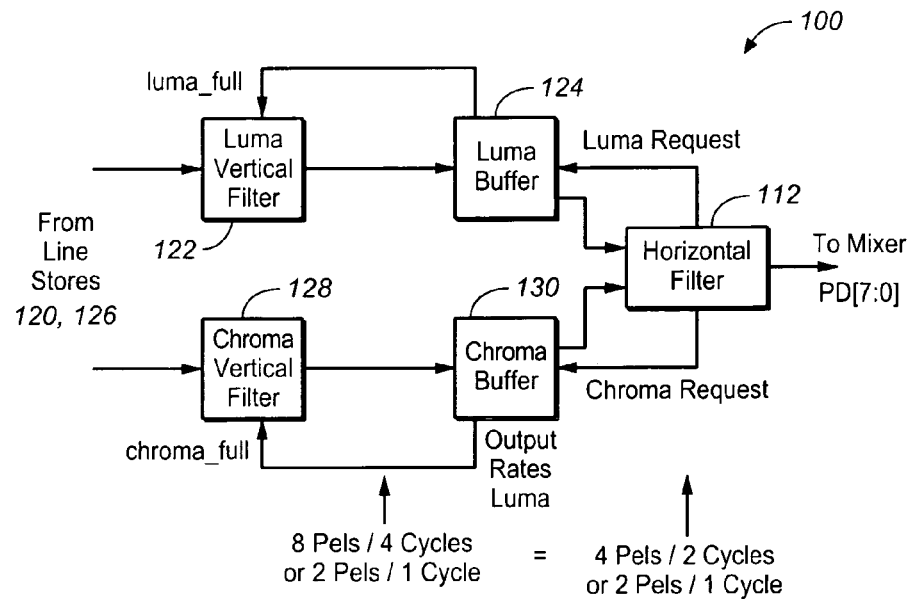
FIG. 25 is a block diagram of an exemplary filter scaling by 0.25.

Referring to FIG. 25, a block diagram of an exemplary filter scaling of 0.25 times using the circuit 100 is shown. When the filter circuit 100 is scaling by 0.25 times, the maximum demand may be made upon the filter circuits 110 and 112. When the vertical filter circuit 110 is operating, the output rate may be 8 pels every 4 clock cycles. The horizontal filter 112 scaling by 0.25 times may generate a luma pels demand rate of 4 pels every 2 clock cycles. The horizontal filter 112 demand rate may be equal to the output rate of the vertical filter circuit 110. The scaling by 0.25 times operation may proceed as described in connection with FIG. 24 (e.g., the vertical filters 122 and 128 may scale one line ahead and fill the luma and chroma buffers 124 and 128). The horizontal filter circuit 112 may control the demand rate on the circuit 110. Four framestore decoding may be implemented in connection with the circuit 100 in order to match the higher bandwidth.

Figure 26:
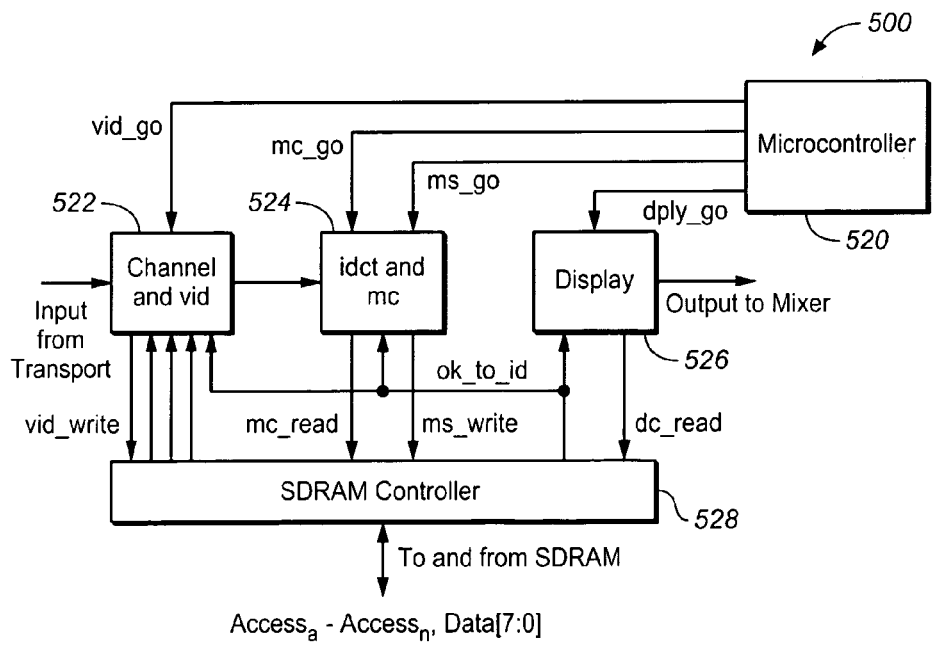
FIG. 26 is a block diagram of a memory controller interface associated with the present invention.

Referring to FIG. 26, a block diagram 500 of a memory controller interface associated with the present invention is shown. The memory controller interface 500 generally comprises a microcontroller 520, a channel and variable length decoder (VLD) circuit (or block) 522, an inverse discrete cosine transform (IDCT) and motion compensation (MC) circuit (or block) 524, a display circuit (or block) 526, and a SDRAM controller 528. All accesses to the SDRAM may be controlled by arbitration in the microcontroller 520. Each module of the circuit 500 interfaces directly with the SDRAM controller 528 and an access may be enabled by one or more 'go' signals (e.g., VLD_GO, MC_GO, MS_GO, CV_GO, CDPLY_GO, DPLY_GO, etc.) presented by the microcontroller 520. The 'go' signals VLD_GO, MC_GO, MS_GO, and DPLY_GO may be generated in response to a combination of the microcontroller 520 hardware and microcode.

For a typical line in a bidirectional (B) or predicted (P) picture, the cycle of accesses to the SDRAM may follow the pattern of giving access to the decode via the signal MC_GO for macroblock processing. When the macroblock processing is complete (e.g., the IDCT is finished), the signal MS_GO may be presented and the data may be written back to the SDRAM.

When the data is written back to the SDRAM, the display 526 may read in response to the signal pair DPLY_GO. In one example implementation of the circuit 500, the display 526 may have 4 positions to read for each display line. The display mode 11 generally scales by 0.5 times. The display mode 11 may be implemented using a reload of 2 luma line and 1 chroma line buffers. The circuit 500 may implement the reloads and scale a line for the display mode 11 with a single display line.

When the vertical filter circuit 110 is scaling by 0.25 times, the maximum demand may be made upon the SDRAM controller 528. When the circuit 110 scales by 0.25 times, the circuit 110 may completely reload the 4 luma line and 2 chroma line buffers for each line filtered. The display of 0.25 times scaled pictures may be implemented by access to each of the 4 SDRAM access positions to read the picture data from SDRAM. In a conventional filter circuit such as the circuit 10 of FIG. 1, (i) accessing each of the 4 SDRAM positions may take longer than a single display line, (ii) the signal pairs DPLY_GO may not provide sufficient access to the SDRAM as the linestores generally reload within 2 SDRAM access positions to allow time for vertical scaling, and (iii) feasibility of the display of 0.25 times scaled pictures may be limited by an internal arbitration state machine within the display address generator 40 and the presenting of the signal DPLY_GO.

Figure 27:
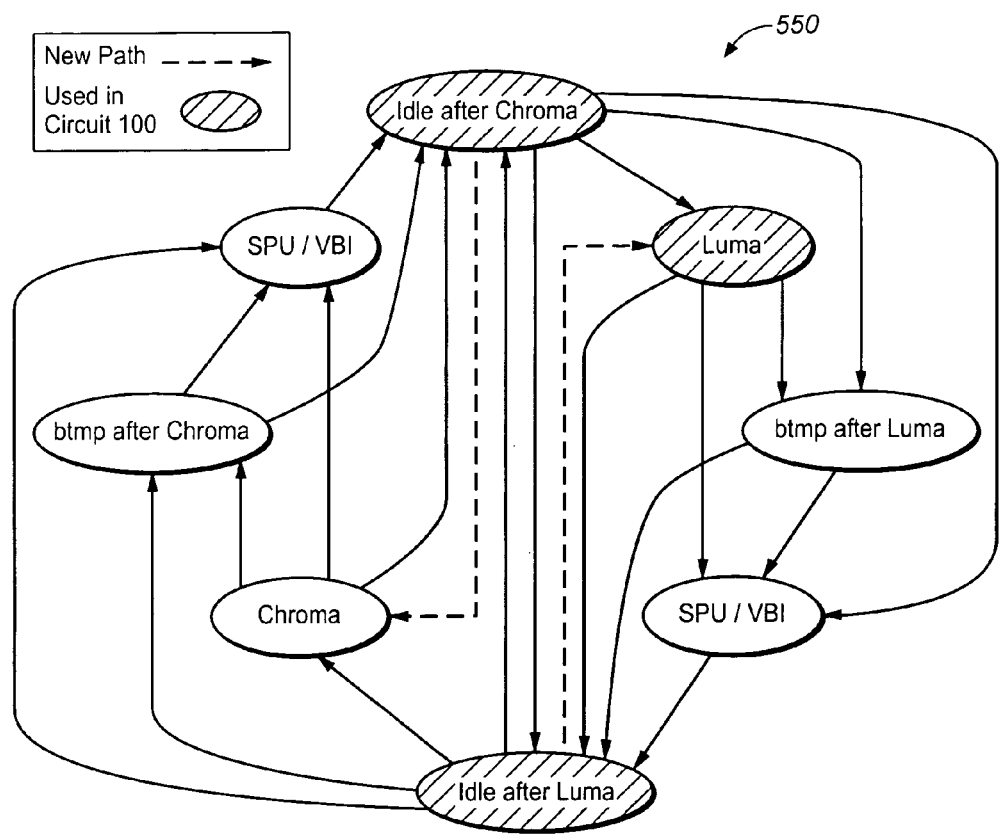
FIG. 27 is a state diagram of an address generator arbitration of the present invention.

Referring to FIG. 27, a state diagram 550 illustrating an operation topology of the present invention is shown. The address generator arbitrator within the microcontroller 520 may alternate SDRAM service requests between the luma and chroma accesses. In the present invention, the OSD (btmp) and SPU/VBI may not be used. The arbitration state machine may alternate between Luma and Chroma picture requests. The conventional circuit 10 does not allow consecutive luma or chroma requests. The conventional circuit 10 has the disadvantage of wasted possible SDRAM accesses from the microcontroller. The FSM 550 of the present invention may allow multiple luma and/or chroma picture requests to follow in sequence. Multiple requests for luma may be implemented when vertically scaling less than 0.5 times.

The 'linedropping' technique may be implemented in the circuit 100 to obtain 0.25 times vertical scaling. The 'linedropping' technique may allow the vertical filter circuit 110 to scale at 0.5 times and may only require the same SDRAM bandwidth as display mode 11.

In one example, the modifications to microcode in the microcontroller 520 to implement 0.25 times scaling may be as described below. The microcode firmware in the microcontroller 520 may present display SDRAM accesses or the signal DPLY_GO at 4 positions within the code. The 4 positions may be the main macroblock processing section and 3 special cases. In one example, the subroutines may be:

mexe: Macroblock Processing.
mcp1: Copy one Macroblock.
rp_cmv_mr: Concealment Motion Vector.
msmb1: Skipped b picture Macroblock.

The subroutine for the signal DPLY_GO may have the following additional line in assembler:

cont ,, cdply_go ,,,, ,,,, ,,, yrg,

The signal CV_GO may be interleaved between the signals DPLY_GO to allow SDRAM access for the channel buffer FIFOs. The signal CV_GO may be presented to the VLD module 522 via the following line:

cont ,, cv_go ,,,, ,,,, ,,, yrg,

Stuffing may be removed from the microcontroller 520 microcode instructions to keep the total code length constant.

The microcontroller 520 hardware may contain dispatch addresses within the microcode for the different startcodes. The new addresses may be updated in the microcontroller 520 microcode module (e.g., U_SQ_DISPATCH). The signals (DPLY_GO, CV_GO, etc.) may pass through a FIFO between the microcode output and the hardware module. The size of the FIFO to store the signals DPLY_GO, CV_GO, etc. may be increased by 4 to represent the number of new signals added. In one example, the FIFO for the signals DPLY_GO, CV_GO, etc. may be located in a module (e.g., MEM_ARBIT) and sized RR24×3. However, other locations and/or sized FIFOs may be implemented accordingly to meet the design criteria of a particular application.

Figure 28:
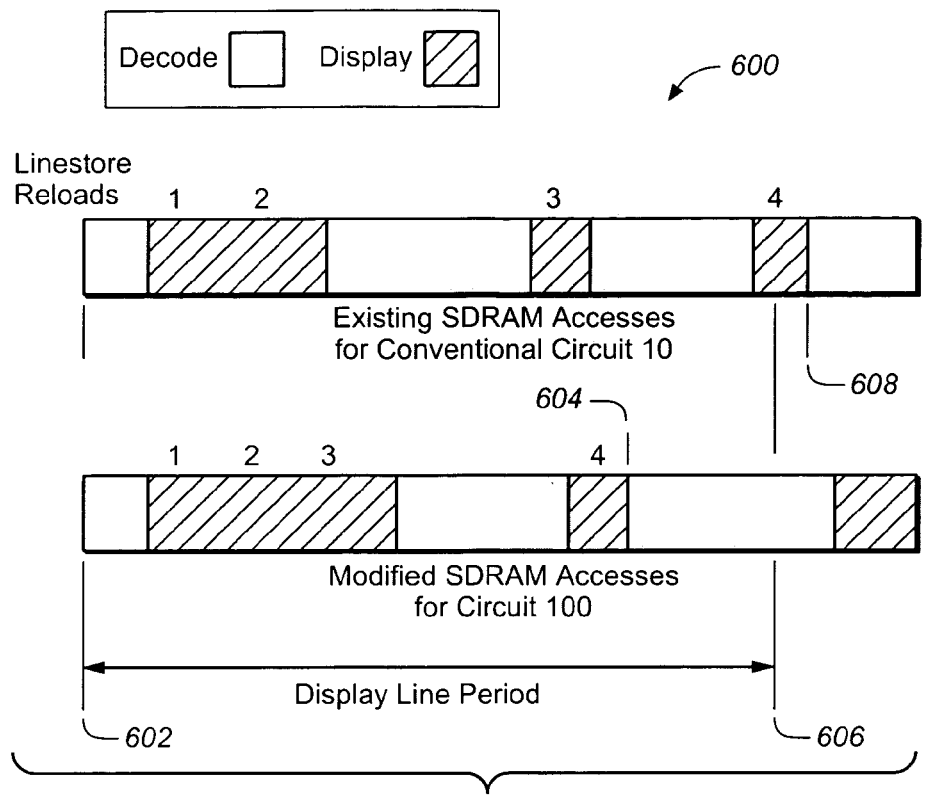
FIG. 28 is a timing diagram of relative decode/display addresses.

Referring to FIG. 28, a timing diagram 600 of relative decode/display addresses is shown. A display line period may begin at a times 602 and complete at a time 606. The display controller 526 may read refill the linestores within the required 2 SDRAM access positions (e.g., a time 604). The accesses implemented for the conventional circuit 10 are not completed until a time 608. The 4 display accesses for the conventional circuit 10 take longer than the display line period. However, the SDRAM accesses for the circuit 100 may read in a longer burst and complete the reload in 2 positions (e.g., less than the display line period).

Figure 29:
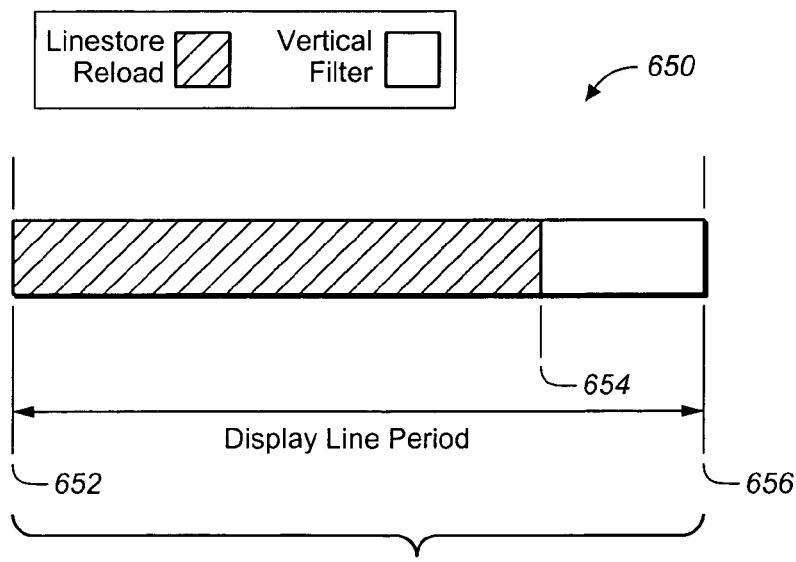
FIG. 29 is a timing diagram of linestore reloading and filtering.

Referring to FIG. 29, a timing diagram 650 illustrating relative timing between linestore reloading and filtering is shown. The display line period may begin at a time 652 and complete at a time 656. However, the linestore reload may be completed at a time 654. The vertical filtering may begin at the time 654 and may complete at the time 656. The vertical filtering generally takes 360 clock cycles at 27 MHz or 20% of a line for an NTSC picture. When the circuit 100 is implemented, the remaining time (e.g., the period from the time 652 to the time 654) may be sufficient to preload the linestores 120 and 126 and perform other SDRAM access for decode.

Figure 30A:
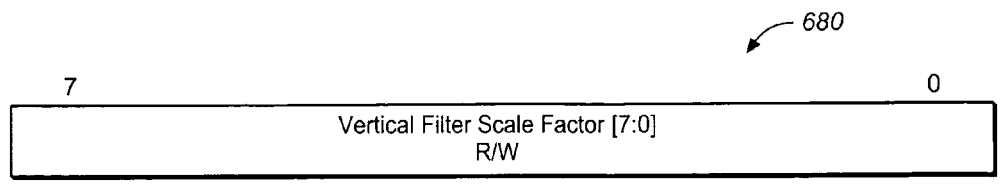
FIGS. 30(a–b) are block diagrams of scale factor registers associated with the present invention.
Figure 30B:
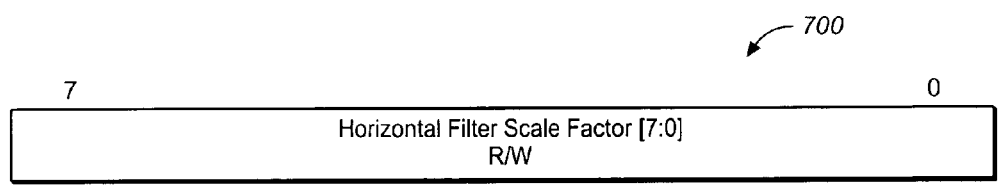

Referring to FIGS. 30(*a–b*), block diagrams of registers 680 and 700, respectively, implemented in the circuit 140 of the present invention are shown. The registers 680 and 700 may be implemented for the variable scaling modes. The implementation of the variable scaling modes may use 11-bit scale factors for defining horizontal and vertical scaling. The conventional circuit 10 interpolation filter has an 8-bit scale factor. In one example, the circuit 100 vertical and horizontal scaling factor values may be expanded by 4 bits. However, other scale factor sizing may be implemented accordingly to meet the design criteria of a particular application.

The register 680 (shown in FIG. 30*a*) may have an address (e.g., 0xbe42.7a8), R/W access, and a reset value of 0. The microcontroller 520 may write a vertical scale factor value to the register 680 to set bits [7:0] of the vertical filter scale factor. The vertical scale factor may be used in the variable scale display modes 12 and 13.

The register 700 (shown in FIG. 30*b*) may have an address (e.g., 0xbe42.7ac), R/W access, and a reset value of 0. The microcontroller 520 may write a horizontal scale factor value to the register 700 to set bits [7:0] of the horizontal filter scale factor. The horizontal scale factor may be used in the variable scale display modes 12 and 13.

Figure 31:
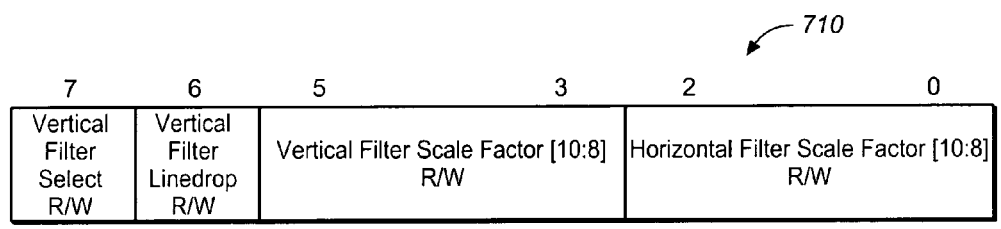
FIG. 31 is a block diagram of a select and scale factor register associated with the present invention.

Referring to FIG. 31, a block diagram of a register 710 implemented in the circuit 140 of the present invention is shown. The register 710 may have an address (e.g., 0xbe42.7b0), R/W access, and reset value of 0.

In the register 710, a bit (e.g., bit [7]) may be configured to set the frequency response of the circuit 100 to one of two preprogrammed values. When the bit [7] is 1, a frequency response 'A' may be selected. When the bit [7] is 0, a frequency response 'B' may be selected. A bit (e.g., bit[6]) may force the circuit 100 to skip alternate lines (or 'linedrop') at the input to the filter circuit 100. The upper 3 bits of the vertical filter scale factor may be stored in bits[5:3] of the register 710. The upper 3 bits of the horizontal filter scale factor may be stored in bits[2:0] of the register 710.

Figure 32A:
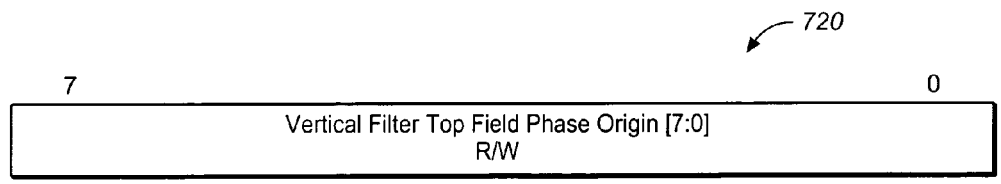
FIGS. 32(a–b) are block diagrams of phase origin registers associated with the present invention.

Referring to FIG. 32*a*, a block diagram of a register 720 implemented in the circuit 140 of the present invention is shown. The register 720 may have an address (e.g., 0xbe42.7b4), R/W access, and a reset value of 0. The microcontroller 520 may write an initial phase value to the register 720 to set the phase origin of the vertical filter phase accumulators 160 and 170. The initial phase value written to the register 720 may be used when the variable scale filter circuit 100 is scaling a top field in the display modes 12 and 13.

Figure 32B:
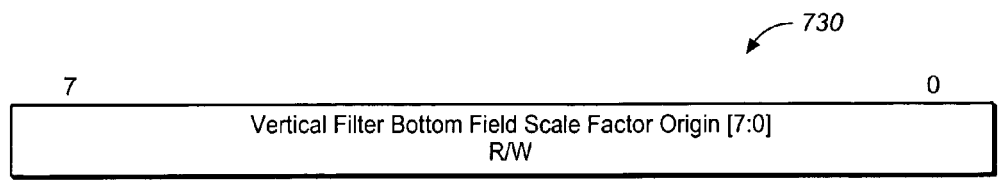

Referring to FIG. 32b, a block diagram of a register 730 implemented in the circuit 140 of the present invention is shown. The register 730 may have an address (e.g., 0xbe42.7b8), R/W access, and a reset value of 0. The microcontroller 520 may write an initial phase value to set the phase origin of the vertical filter phase accumulators 160 and 170. The initial phase value written to the register 730 may be used when the variable scale filter circuit 100 is scaling a bottom field in the display modes 12 and 13.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus for variably scaling video picture signals comprising:
   a first circuit configured to generate one or more data signals vertically scaled to a first value in response to (i) said video picture signals and (ii) one or more first control signals;
   a second circuit configured to generate one or more output signals horizontally scaled to a second value in response to (i) said one or more data signals and (ii) said one or more first control signals, wherein said first value and said second value are independently selectable; and
   an address generator circuit configured to generate said one or more first control signals, wherein said address generator circuit comprises a finite state machine configured to allow multiple luma picture requests and multiple chroma picture requests to follow in sequence and said finite state machine provides (i) an idle after chroma state configured to move to a chroma state in response to said multiple chroma picture requests and (ii) an idle after luma state configured to move to a luma state in response to said multiple luma picture requests.

2. The apparatus according to claim 1, wherein said first circuit comprises (i) a luma circuit configured to generate a luma component of said data signals and (ii) a chroma circuit configured to generate one or more chroma components of said data signals.

3. The apparatus according to claim 1, wherein said second circuit is further configured to decimate and interpolate said data signals.

4. The apparatus according to claim 1, wherein said apparatus is programmable to scale said output signals to one or more display modes.

5. The apparatus according to claim 4, wherein said apparatus is configured to automatically reset a starting address of a display line when an end of said display line is not displayed.

6. The apparatus according to claim 4, wherein said one or more output signals are scalable to any value in a range of 0.25 times to 4.0 times said video picture signals.

7. The apparatus according to claim 2, wherein said luma circuit comprises:
   a first memory circuit configured to buffer a luma component of said video picture signals;
   a first filter circuit coupled to said first memory circuit and configured to generate said luma component of said data signals; and
   a second memory circuit coupled to said first filter circuit and configured to buffer said luma component of said data signals.

8. The apparatus according to claim 7, wherein said chroma circuit comprises:
   a third memory circuit configured to buffer one or more chroma components of said video picture signals;
   a second filter circuit coupled to said third memory circuit and configured to generate said one or more chroma components of said data signals; and
   a fourth memory circuit coupled to said second filter circuit and configured to buffer said one or more chroma components of said data signals.

9. The apparatus according to claim 1, wherein said address generator circuit is configured to generate said first control signals in response to one or more second control signals from a microcontroller circuit.

10. The apparatus according to claim 9, wherein said apparatus comprises a single-chip MPEG-2 decoder.

11. The apparatus according to claim 7, wherein said first filter circuit further comprises one or more accumulator circuits configured to define a number of said video picture signals to be buffered in said first memory circuit in response to said one or more first control signals.

12. The apparatus according to claim 8, wherein said second filter circuit further comprises one or more accumulator circuits configured to define a number of said video picture signals to be buffered in said third memory circuit in response to said one or more first control signals.

13. The apparatus according to claim 1, wherein said second circuit controls an output rate of said data signals from said first circuit in response to said first value and said second value.

14. The apparatus according to claim 1, wherein said second circuit comprises one or more accumulator circuits configured to select one or more of said data signals in response to said one or more first control signals.

15. An apparatus for variably scaling video picture signals comprising:
   means for generating one or more data signals vertically scaled to a first value in response to (i) said video picture signals and (ii) one or more control signals;
   means for generating one or more output signals horizontally scaled to a second value in response to (i) said one or more data signals and (ii) said one or more control signals, wherein said first value and said second value are independently selectable; and
   means for generating said one or more control signals configured to provide a number of states configured to allow multiple luma picture requests and multiple chroma picture requests to follow in sequence, wherein said number of states includes (i) an idle after chroma state configured to move to a chroma state in response to said multiple chroma picture requests and (ii) an idle after luma state configured to move to a luma state in response to said multiple luma picture requests wherein said idle after luma state is further configured to move to any of (i) said chroma state, (ii) a BTMP after chroma state, (iii) an SPU/VBI state, (iv) said luma state and (v) said idle after chroma state.

16. A method for variably scaling video picture signals comprising the steps of:

(A) generating one or more data signals vertically scaled to a first value in response to (i) said video picture signals and (ii) one or more control signals;

(B) generating one or more output signals horizontally scaled to a second value in response to (i) said one or more data signals and (ii) said one or more control signals, wherein said first value and said second value are independently selectable; and (C) generating said one or more control signals in response to a number of states configured to allow multiple luma picture requests and multiple chroma picture requests to follow in sequence, wherein said number of states includes (i) an idle after chroma state configured to move to a chroma state in response to said multiple chroma picture requests and (ii) an idle after luma state configured to move to a luma state in response to said multiple luma picture requests wherein said idle after luma state is further configured to move to any of (i) said chroma state, (ii) a BTMP after chroma state, (iii) an SPU/VBI state, (iv) said luma state and (v) said idle after chroma state.

17. The method according to claim 16, wherein step B further comprises the steps of:

decimating said data signals; and interpolating said data signals.

18. The method according to claim 16, wherein step B further comprises the step of:

controlling an output rate of said data signals in response to said first value and said second value.

19. The method according to claim 16, wherein said method further comprises the step of:

programmably scaling said output signals to one or more display modes.

20. The method according to claim 19, wherein said step of programmably scaling said output signals further comprises the step of:

automatically resetting a display line address when some of a picture is not displayed.

21. The apparatus according to claim 1, wherein said idle after chroma state is further configured to move to any of (i) said luma state, (ii) a BTMP after luma state, (iii) an SPU/VBI state, (iv) said idle after luma state, and (v) said chroma state.

22. The apparatus according to claim 1, wherein said idle after luma state is further configured to move to any of (i) said chroma state, (ii) a BTMP after chroma state, (iii) an SPU/VBI state, (iv) said luma state and (v) said idle after chroma state.

* * * * *